United States Patent
Tajima et al.

(10) Patent No.: US 9,774,184 B2
(45) Date of Patent: Sep. 26, 2017

(54) POWER SUPPLY DEVICE, POWER SUPPLY MANAGING DEVICE, METHOD FOR DETECTING CONNECTION POSITION OF POWER SUPPLY DEVICE, AND POWER SUPPLY SYSTEM

(75) Inventors: Shigeru Tajima, Kanagawa (JP); Mamiko Inamori, Kanagawa (JP)

(73) Assignee: Sony Corporation, Tokyo (JP)

( * ) Notice: Subject to any disclaimer, the term of this patent is extended or adjusted under 35 U.S.C. 154(b) by 953 days.

(21) Appl. No.: 13/426,035

(22) Filed: Mar. 21, 2012

(65) Prior Publication Data

US 2012/0248877 A1    Oct. 4, 2012

(30) Foreign Application Priority Data

Mar. 28, 2011    (JP) ................ 2011-069513

(51) Int. Cl.
*H02J 1/08*    (2006.01)
*H02J 1/10*    (2006.01)
(52) U.S. Cl.
CPC ............... *H02J 1/08* (2013.01); *H02J 1/108* (2013.01); *Y10T 307/653* (2015.04)
(58) Field of Classification Search
None
See application file for complete search history.

(56) References Cited

U.S. PATENT DOCUMENTS

| | | | | |
|---|---|---|---|---|
| 6,397,280 | B1* | 5/2002 | Nitschke et al. | 710/110 |
| 7,091,876 | B2* | 8/2006 | Steger | H04L 12/403 |
| | | | | 340/9.1 |
| 7,373,224 | B2* | 5/2008 | Goetz et al. | 701/32.6 |
| 2009/0021955 | A1* | 1/2009 | Kuang et al. | 362/479 |
| 2010/0185841 | A1* | 7/2010 | Monreal | 713/2 |
| 2011/0185093 | A1* | 7/2011 | Matsuo et al. | 710/110 |
| 2011/0208886 | A1* | 8/2011 | Sugiura et al. | 710/110 |

* cited by examiner

*Primary Examiner* — Rexford Barnie
*Assistant Examiner* — David Shiao
(74) *Attorney, Agent, or Firm* — Paratus Law Group, PLLC

(57) ABSTRACT

Disclosed herein is a power supply device including: a position detection signal output section configured to output a position detection signal to a line allowing a current flow in only one direction in response to an order to output the position detection signal from a power supply managing device connected to a bus line including the line; a position detection signal detector configured to detect the position detection signal that is output from another device and flows through the line; and a position detection signal responder configured to respond that the position detection signal is detected to the power supply managing device when the position detection signal is detected by the position detection signal detector.

11 Claims, 20 Drawing Sheets

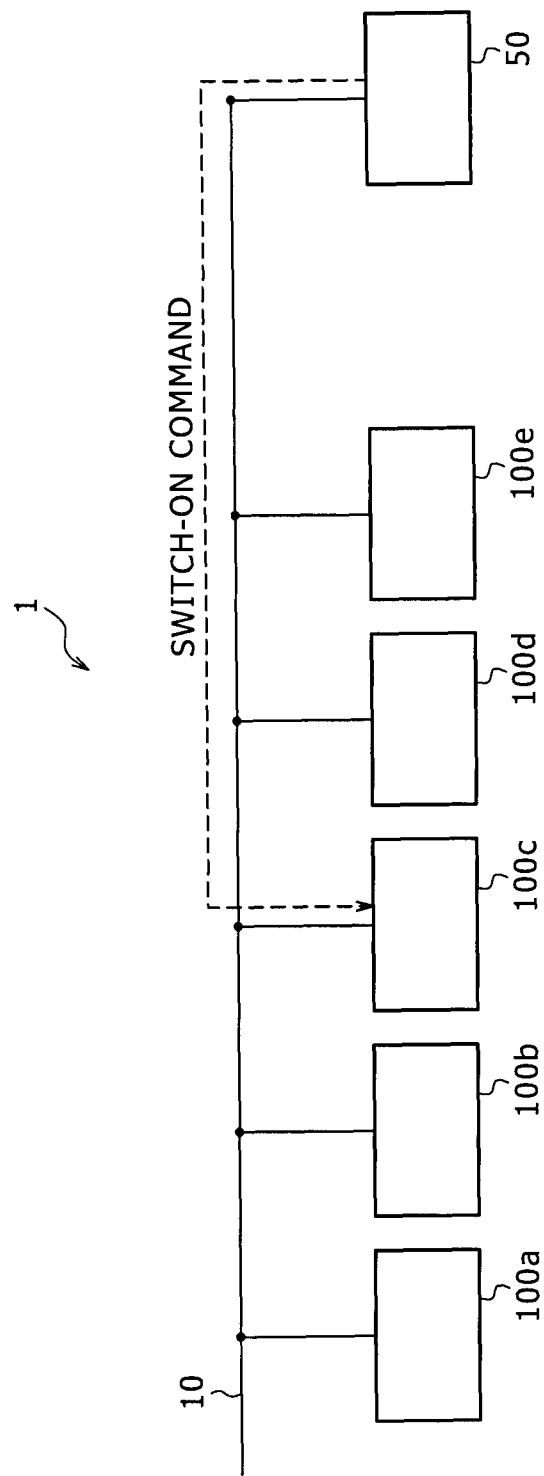

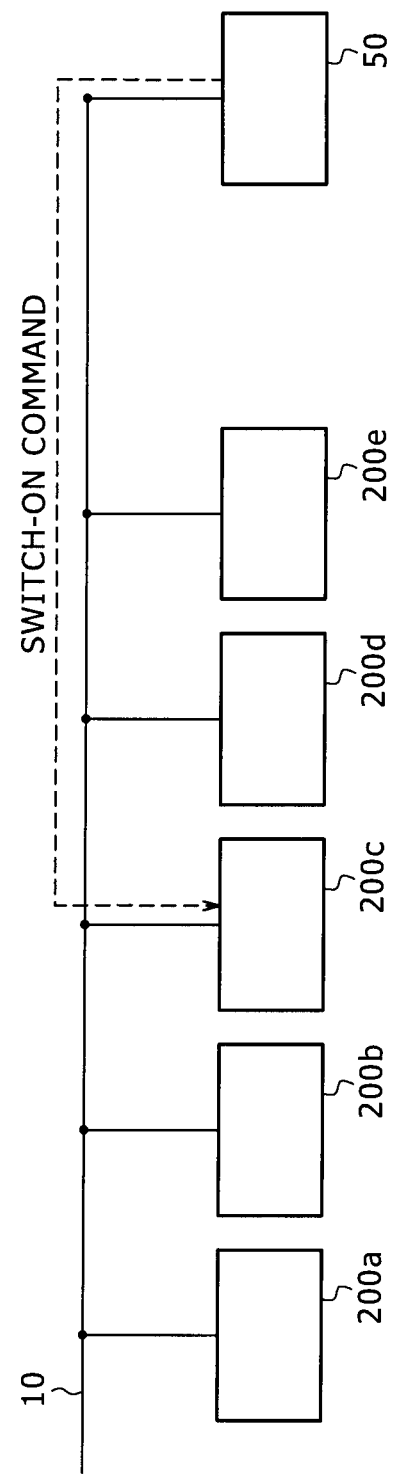

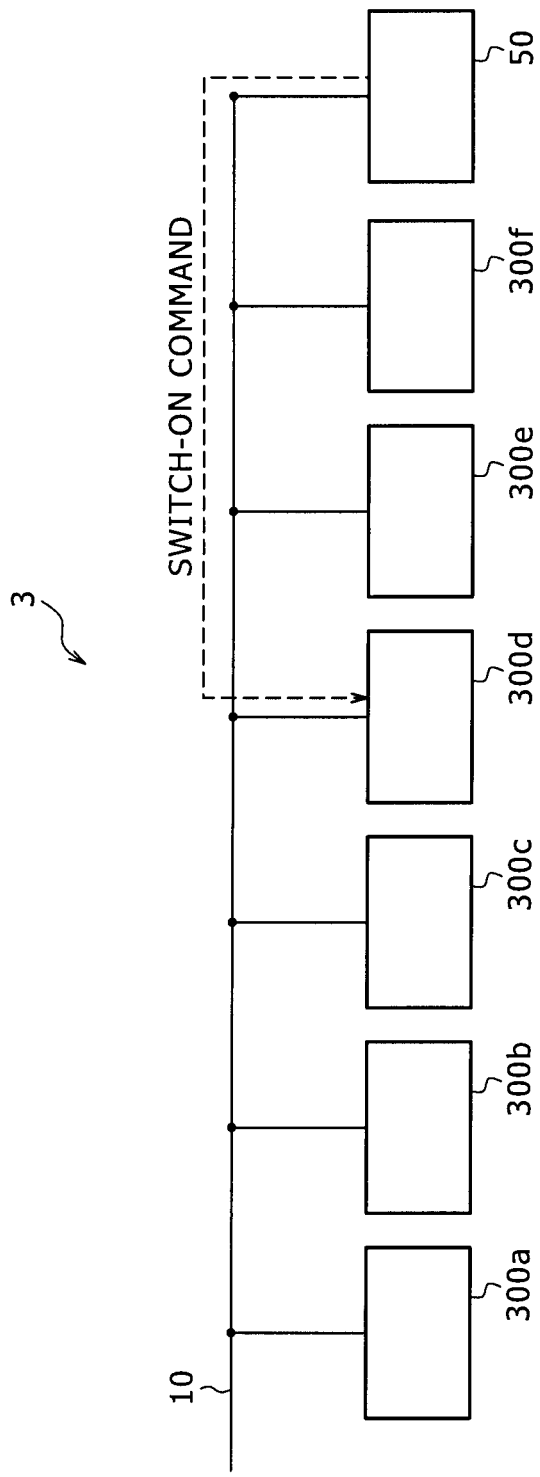

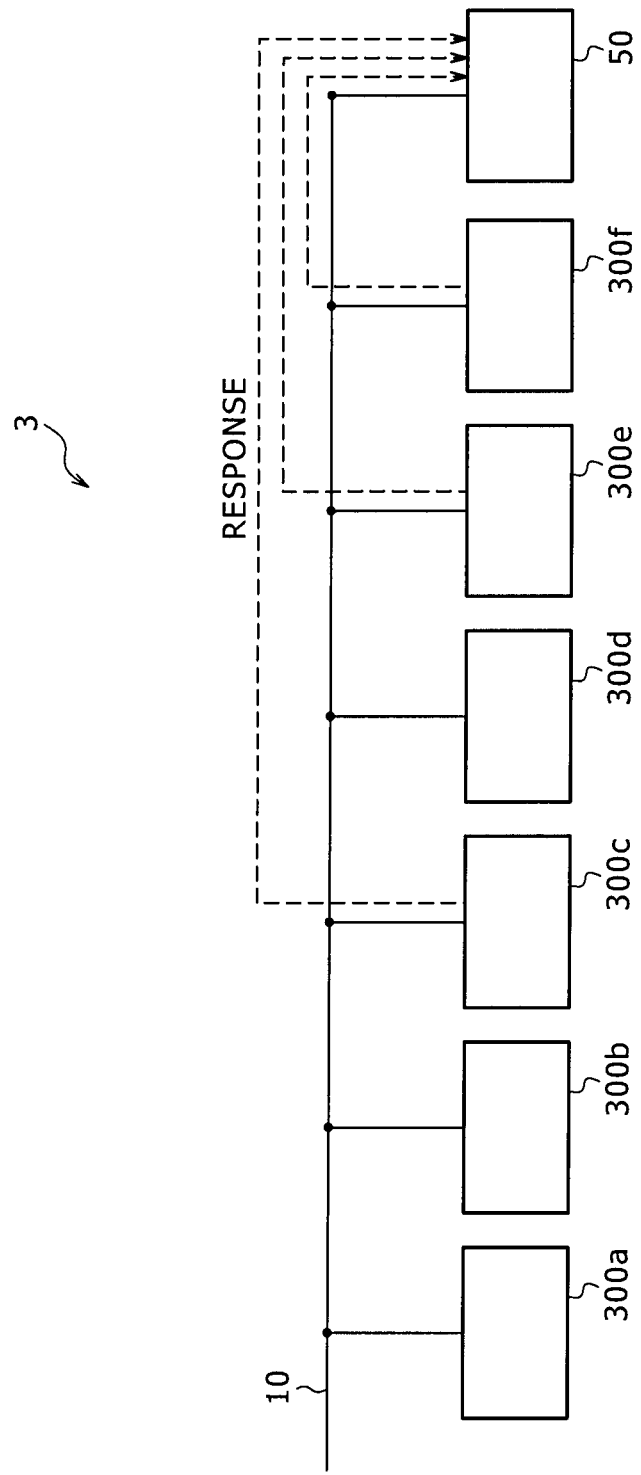

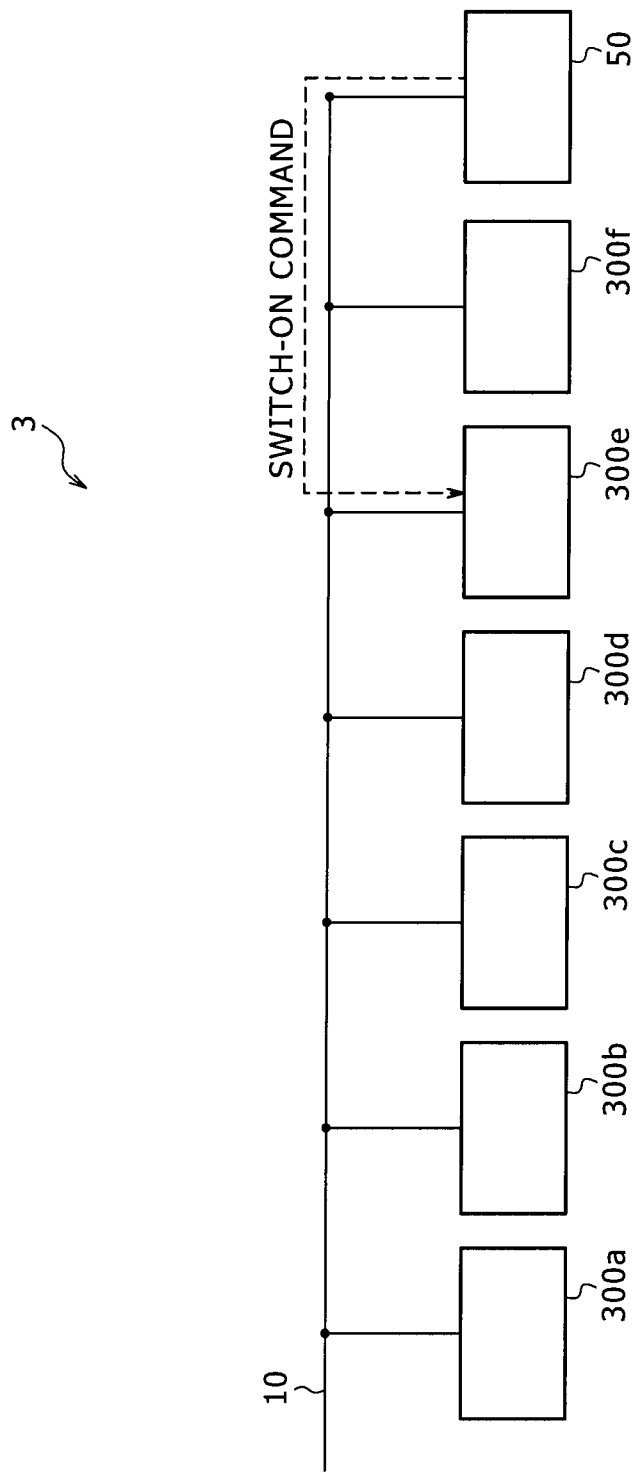

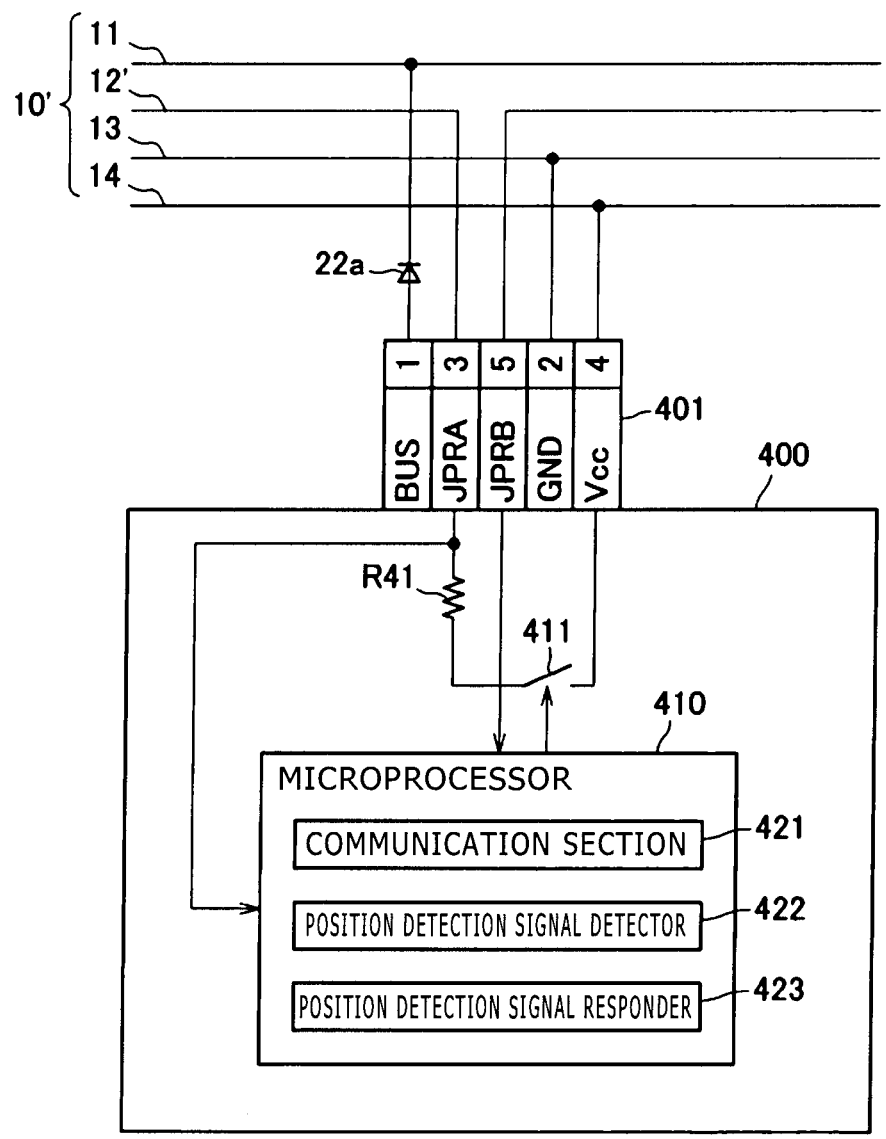

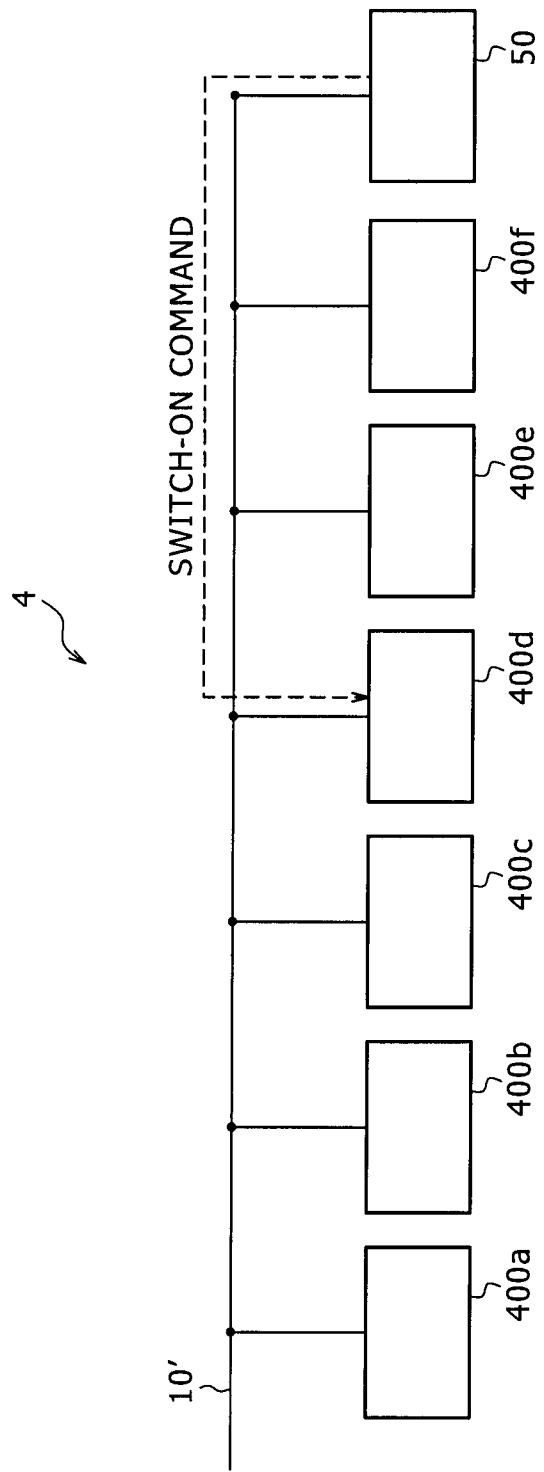

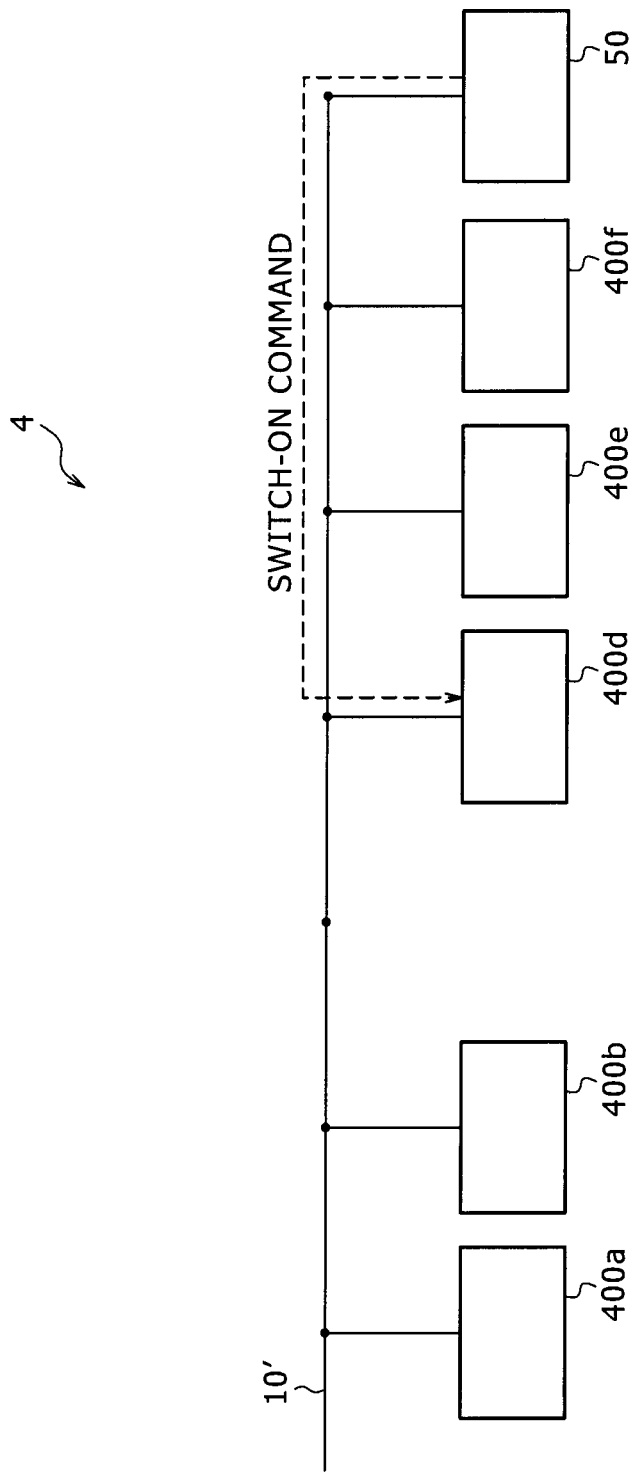

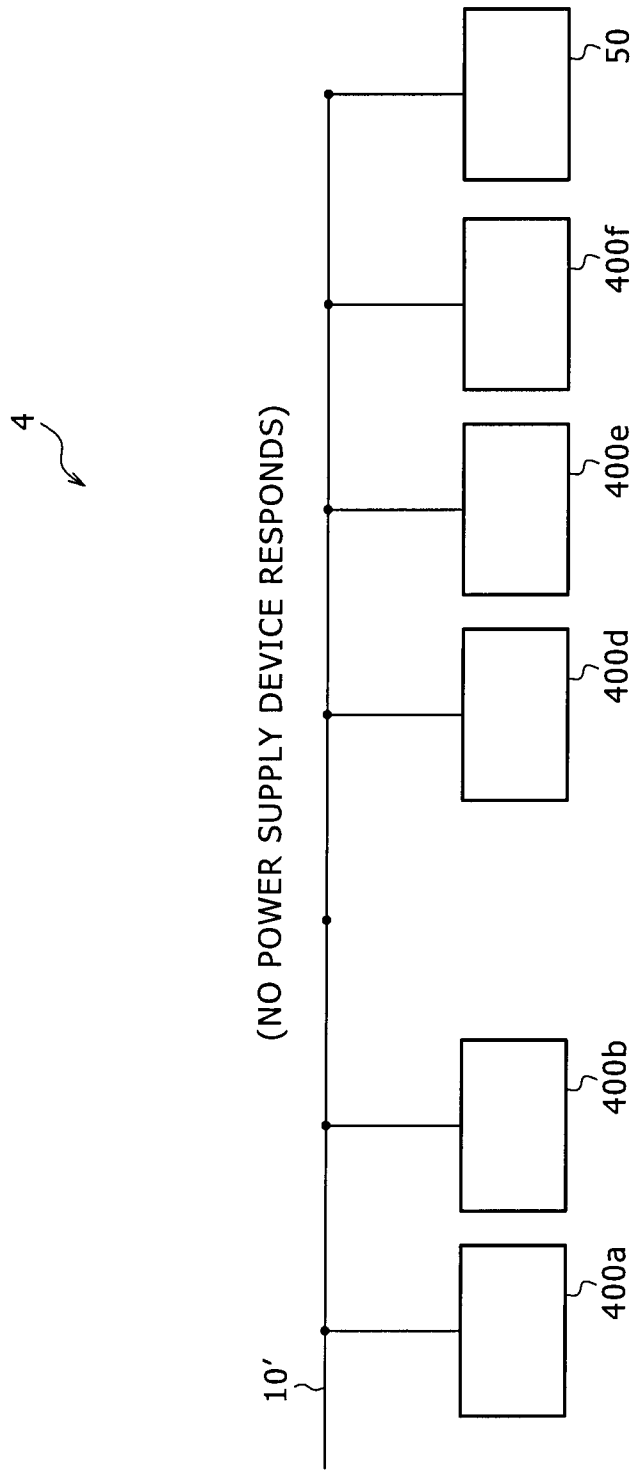

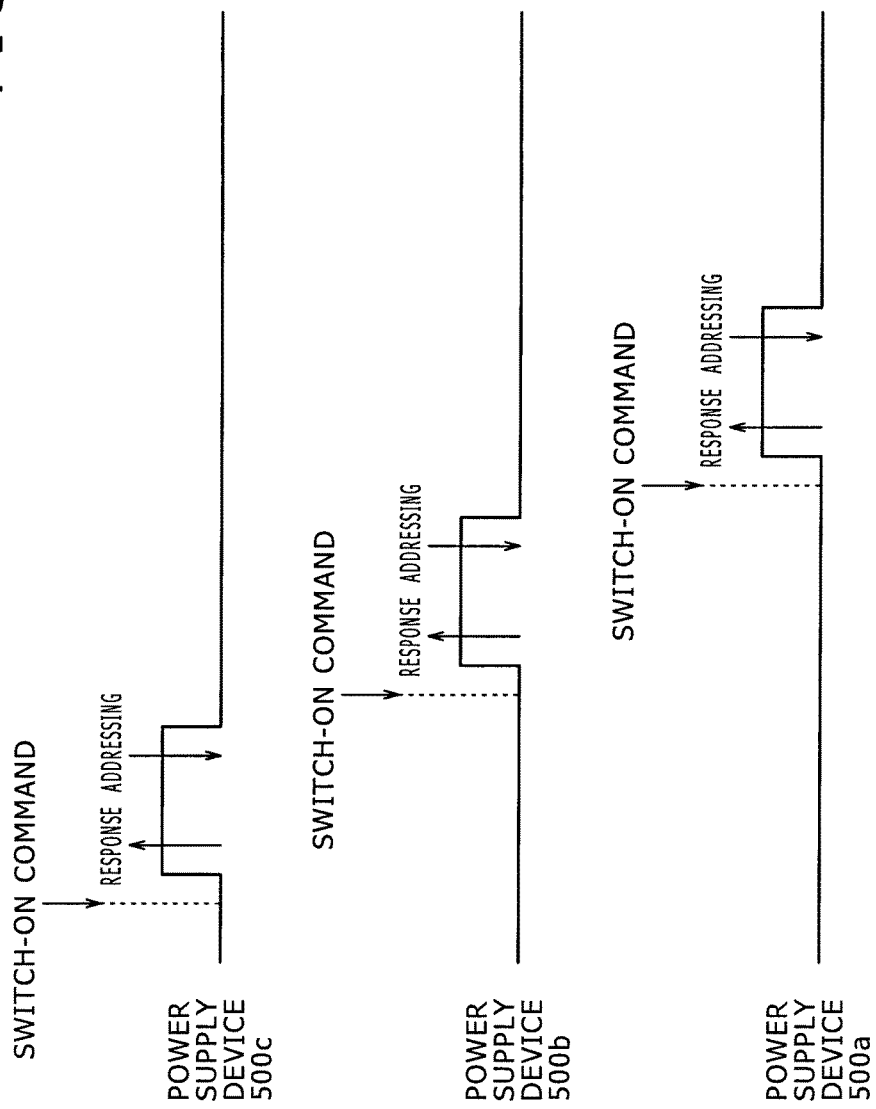

POWER SUPPLY DEVICE, POWER SUPPLY MANAGING DEVICE, METHOD FOR DETECTING CONNECTION POSITION OF POWER SUPPLY DEVICE, AND POWER SUPPLY SYSTEM

BACKGROUND

The present disclosure relates to a power supply device, a power supply managing device, a method for detecting the connection position of a power supply device, and a power supply system.

Series and parallel connection of power sources or loads are the basis of the electrical circuit. In the case of the passive load, series and parallel connection does not involve principle difficulty and the corresponding electrical wiring can be realized. In contrast, in the case of the power source, danger exists unless the voltage or current capacity thereof is taken into consideration, and mere series and parallel connection cannot be made.

For example, in the case of parallel connection of cells, a condition that the output voltages of the individual cells connected in parallel are equal to each other and a condition that the kinds of cells (in addition, even manufacturer and lot) are the same are necessary. This is because of the following reason. Specifically, if the kinds of individual cells are different, the charge and discharge characteristics are different. Thus, even when the voltage is the same at the initial stage, imbalance of the voltage occurs over time. This causes adverse effects that any cell charges another cell and that stress is applied only to a given cell.

In the series connection, the current capacity of the whole cells connected in series depends on the lowest current capacity among the cells, and effective connection is impossible unless the current capacities of the respective elements are equivalent to each other. However, by sufficiently equalizing the electrical characteristics or taking a countermeasure such as control of current distribution to the respective elements (in the case of parallel connection) or equalization of the current capacity (in the case of series connection), series and parallel connection of power sources and switching of the connection are also permitted and are used in practice.

SUMMARY

For the series and parallel connection of power sources and switching of the connection, it is required for the device that carries out the switching to properly understand which position the power source physically exists at relative to the bus line in advance.

There is a need for a technique to provide novel, improved power supply device, power supply managing device, method for detecting the connection position of a power supply device, and power supply system each allowing understanding of how power sources are connected to a bus line through notification of information by which how the power sources are connected to the bus line can be understood and acquisition of this notification.

According to an embodiment of the present disclosure, there is provided a power supply device including a position detection signal output section that outputs a position detection signal to a line allowing a current flow in only one direction in response to an order to output the position detection signal from a power supply managing device connected to a bus line including the line, a position detection signal detector that detects the position detection signal that is output from another device and flows through the line, and a position detection signal responder that responds that the position detection signal is detected to the power supply managing device when the position detection signal is detected by the position detection signal detector.

According to the embodiment of the present disclosure, the position detection signal output section outputs the position detection signal to the line allowing a current flow in only one direction in response to an order to output the position detection signal from the power supply managing device connected to the bus line including the line. The position detection signal detector detects the position detection signal that is output from another device and flows through the line. The position detection signal responder responds that the position detection signal is detected to the power supply managing device when the position detection signal is detected by the position detection signal detector. Due to this configuration, the power supply device according to the embodiment of the present disclosure can detect the position detection signal and respond that the position detection signal is detected to the power supply managing device.

According to another embodiment of the present disclosure, there is provided a power supply managing device including a position detection signal output director that orders one power supply device among power supply devices connected to a bus line including a line allowing a current flow in only one direction to output, to the line, a position detection signal to detect the connection position of each of the power supply devices on the bus line, and a connection position detector that receives a response from the power supply device that has detected the position detection signal, and detects the position of connection of the power supply device to the bus line.

According to another embodiment of the present disclosure, there is provided a method for detecting the connection position of a power supply device. The method includes ordering one power supply device among power supply devices connected to a bus line including a line allowing a current flow in only one direction to output, to the line, a position detection signal to detect the connection position of each of the power supply devices on the bus line, and receiving a response from the power supply device that has detected the position detection signal, and detecting the position of connection of the power supply device to the bus line.

According to another embodiment of the present disclosure, there is provided a power supply system including a plurality of power supply devices connected to a bus line including a line allowing a current flow in only one direction, and a power supply managing device connected to the bus line. The power supply managing device includes a position detection signal output director that orders one power supply device among the power supply devices to output, to the line, a position detection signal to detect the connection position of each of the power supply devices on the bus line, and a connection position detector that receives a response from the power supply device that has detected the position detection signal, and detects the position of connection of the power supply device to the bus line. The power supply device includes a position detection signal output section that outputs the position detection signal to the line in response to an order to output the position detection signal from the power supply managing device, a position detection signal detector that detects the position detection signal that is output from another power supply device and flows through the line, and a position detection signal responder that responds that the position detection signal is detected to the power supply managing device when the position detection signal is detected.

As described above, the embodiments of the present disclosure can provide novel, improved power supply device, power supply managing device, method for detecting the connection position of a power supply device, and power supply system each allowing understanding of how power sources are connected to a bus line through notification of information by which how the power sources are connected to the bus line can be understood and acquisition of this notification.

BRIEF DESCRIPTION OF THE DRAWINGS

FIG. 4A is an explanatory diagram showing a method for detecting the positions of the power supply devices on a bus line;

FIG. 6A is an explanatory diagram showing a method for detecting the positions of the power supply devices on the bus line;

FIG. 8A is an explanatory diagram showing a method for detecting the positions of the power supply devices on the bus line;

FIG. 8B is an explanatory diagram showing the method for detecting the positions of the power supply devices on the bus line;

FIG. 8C is an explanatory diagram showing the method for detecting the positions of the power supply devices on the bus line;

FIG. 9 is an explanatory diagram showing the configuration of a power supply device according to a fourth embodiment of the present disclosure;

FIG. 10A is an explanatory diagram showing a method for detecting the positions of the power supply devices on the bus line;

FIG. 10C is an explanatory diagram showing the method for detecting the positions of the power supply devices on the bus line;

FIG. 10D is an explanatory diagram showing the method for detecting the positions of the power supply devices on the bus line;

FIG. 12 is an explanatory diagram showing a method for detecting the positions of the power supply devices on the bus line.

DETAILED DESCRIPTION OF THE PREFERRED EMBODIMENTS

Preferred embodiments of the present disclosure will be described in detail below with reference to the accompanying drawings. In the present specification and drawings, the constituent element having substantially the same functional configuration is given the same numeral or symbol. Thereby, overlapping description is omitted.

The order of the description is as follows.
<1. First Embodiment of Present Disclosure>
[1-1. Basic Configuration of Power Supply System]
[1-2. Configuration of Power Supply Device]
[1-3. Configuration of Power Supply Managing Device]
[1-4. Method for Detecting Position of Power Supply Device]
<2. Second Embodiment of Present Disclosure>
[2-1. Configuration of Power Supply Device]
[2-2. Method for Detecting Position of Power Supply Device]<3. Third Embodiment of Present Disclosure>
[3-1. Configuration of Power Supply Device]
[3-2. Method for Detecting Position of Power Supply Device]
<4. Fourth Embodiment of Present Disclosure>
[4-1. Configuration of Power Supply Device]
[4-2. Method for Detecting Position of Power Supply Device]
<5. Fifth Embodiment of Present Disclosure>
[5-1. Configuration of Power Supply System]
[5-2. Method for Detecting Position of Power Supply Device]
<6. Summarization>

Figure 1:
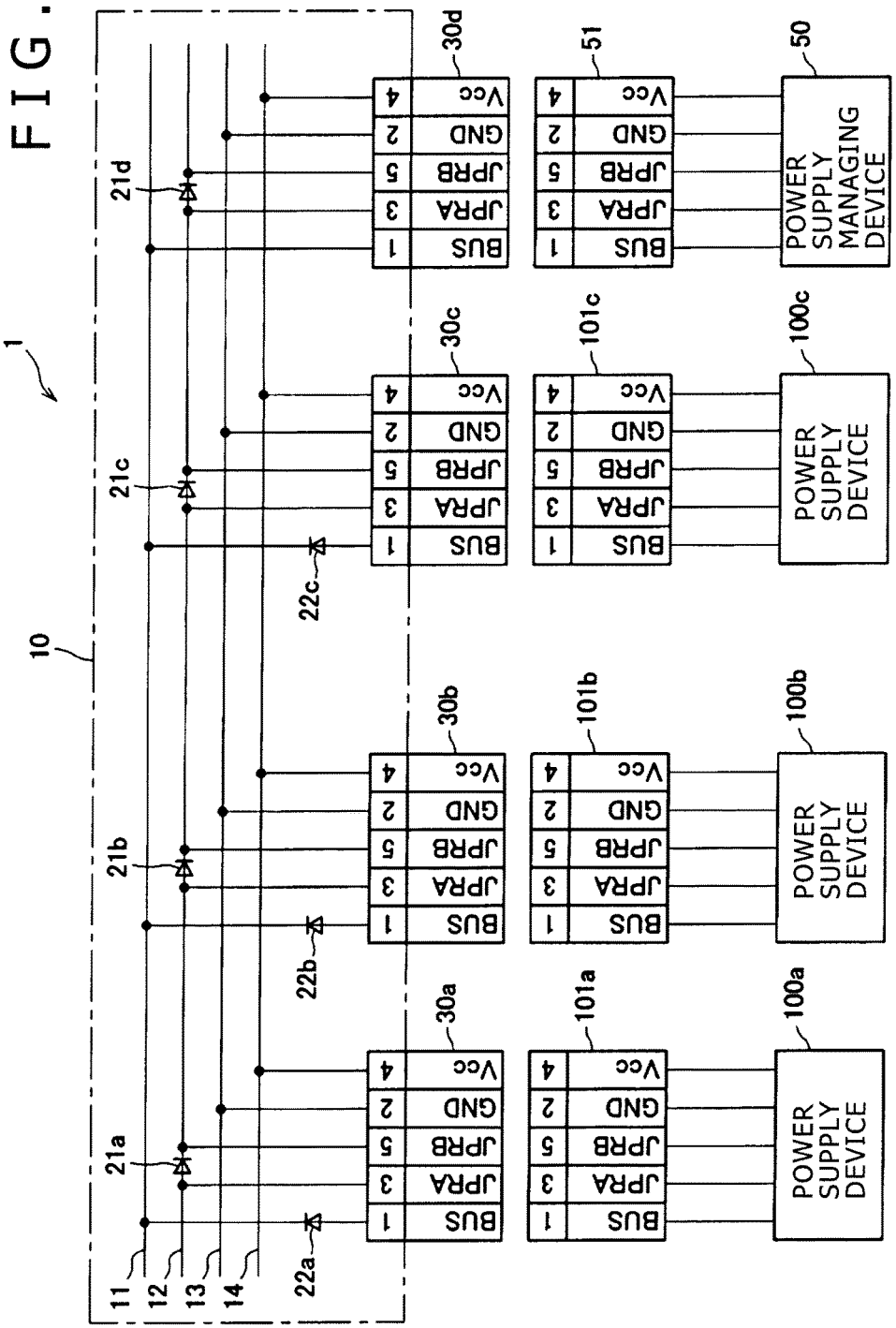
FIG. 1 is an explanatory diagram showing the basic configuration of a power supply system according to a first embodiment of the present disclosure.

1. First Embodiment of Present Disclosure 1-1. Basic Configuration of Power Supply System First, the basic configuration of a power supply system according to a first embodiment of the present disclosure will be described. FIG. 1 is an explanatory diagram showing the basic configuration of a power supply system 1 according to the first embodiment of the present disclosure. The basic configuration of the power supply system 1 according to the first embodiment of the present disclosure will be described below with use of FIG. 1.

As shown in FIG. 1, the power supply system 1 according to the first embodiment of the present disclosure includes power supply devices 100a, 100b, 100c . . . connected to a bus line 10 and a power supply managing device 50 also connected to the bus line 10.

The bus line 10 is composed of four lines 11, 12, 13, and 14 as shown in FIG. 1. The line 11 is a power output line for outputting power from the power supply devices 100a, 100b, 100c . . . . The line 12 is a line for connecting the power supply devices 100a, 100b, 100c in series. As shown in FIG. 1, in the line 12, diodes 21a, 21b, 21c . . . are provided corresponding to the positions to which the power supply devices 100a, 100b, 100c . . . are connected. The diodes 21a, 21b, 21c enable the line 12 to play a role to connect the power supply devices 100a, 100b, 100c . . . in series. The line 13 is a common line of the power supply devices 100a, 100b, and 100c and the power supply managing device 50. The line 14 is a power supply line for operation to which power for operating the power supply devices 100a, 100b, and 100c is supplied.

In the power supply system 1 shown in FIG. 1, connectors each composed of five pins are used for the connection between the bus line 10 and the power supply devices 100a, 100b, and 100c and the power supply managing device 50. Diodes 22a, 22b, and 22c are provided between the power supply devices 100a, 100b, and 100c and the line 11 of the bus line 10. In contrast, no diode is provided for pin 1 (BUS) of a connector 30d to connect the bus line 10 to the power supply managing device 50. This is because pin 1 of the connector 30d is equivalent to a power input port for the power supply managing device 50.

The power supply devices 100a, 100b, and 100c are connected to the bus line 10 by connectors 30a, 30b, and 30c and have connectors 101a, 101b, and 101c, respectively, for the connection to the bus line 10. The power supply devices 100a, 100b, and 100c are devices capable of being dynamically connected to the bus line 10 and being dynamically disconnected from the bus line 10. Therefore, it is envisaged that the power supply devices 100a, 100b, and 100c are unplugged from the bus line 10 and that the positions of connection of the power supply devices 100a, 100b, and 100c to the bus line 10 are interchanged.

In the power supply system 1 shown in FIG. 1, the power flows from the left toward the right in FIG. 1 in the case of connecting the power supply devices 100a, 100b, 100c . . . in series by using the bus line 10. Therefore, control as to which power supply devices should be connected in series to each other may not be carried out unless which power supply device is connected to which position on the bus line 10 can be understood. This applies also to the case in which the power supply devices connected in series are connected in parallel.

Therefore, for switching of the series/parallel connection of the power supply devices, it is desired for the power supply managing device 50 to understand the positions of connection of the respective power supply devices to the bus line 10. As the simplest method, there is e.g. a method in which IDs are set in turn from the left side of the bus line 10 and the connection positions of the power supply devices are not changed. However, fixing the connection positions of the power supply devices precludes the dynamic connection and disconnection of the power supply devices. Therefore, it is desired for the power supply managing device 50 to understand the positions of connection of the respective power supply devices to the bus line 10 by any method.

In the present embodiment, a unique ID is set for each power supply device at the time of manufacturing in order that the power supply managing device 50 can understand the positions of connection of the respective power supply devices to the bus line 10. This is a thought similar to that of setting of a MAC address for a device that is connectable to a network for example. This allows each power supply device to retain a world-unique ID. In this case, when the power supply devices are connected to the bus line 10, the power supply managing device 50 can get to know the unique ID of each power supply device by communication between the power supply device and the power supply managing device 50. The communication between the power supply device and the power supply managing device 50 may be communication by use of the bus line 10 or may be wireless communication in which the bus line 10 is not used.

Even when a unique ID is not set for each power supply device at the time of manufacturing, the power supply managing device 50 assigns addresses that allow each power supply device to be uniquely identified instead of the unique ID in order to identify the power supply devices connected to the bus line 10. Thereby, the power supply managing device 50 can identify each power supply device.

Therefore, it is understood that management of the IDs or addresses of the power supply devices connected to the bus line 10 can be easily carried out by an existing technique.

However, although the power supply device is managed based on the ID or address, the power supply device can be connected to an arbitrary connector provided on the bus line 10. Therefore, in switching of series/parallel connection of the power supply devices, the power supply managing device 50 should bind the positions of the connectors on the bus line 10 to the IDs or addresses of the power supply devices. The following will describe a method in which the binding of the positions of the connectors on the bus line 10 to the IDs or addresses of the power supply devices is automatically carried out and the power supply managing device 50 can switch the series/parallel connection of the power supply devices based on this binding.

1-2. Configuration of Power Supply Device

Figure 2:
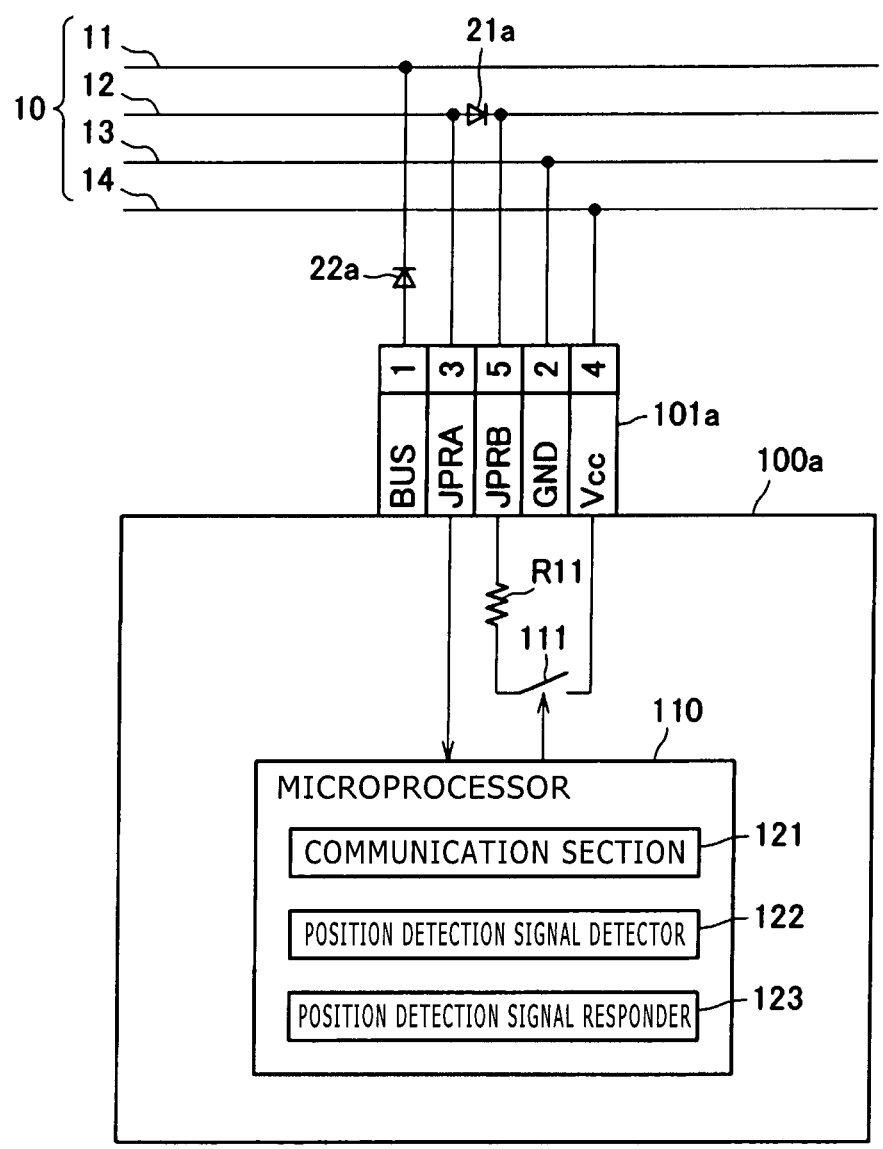
FIG. 2 is an explanatory diagram showing the configuration of a power supply device according to the first embodiment of the present disclosure.

FIG. 2 is an explanatory diagram showing the configuration of the power supply device 100a according to the first embodiment of the present disclosure. Although the configuration of the power supply device is shown in FIG. 2 by taking the power supply device 100a as an example, the other power supply devices 100b, 100c . . . also have the same configuration as that of the power supply device 100a. The configuration of the power supply device 100a according to the first embodiment of the present disclosure will be described below with use of FIG. 2.

As shown in FIG. 2, the power supply device 100a according to the first embodiment of the present disclosure includes the connector 101a, a microprocessor 110, a switch 111, and a resistor R11. The power supply device 100a shown in FIG. 2 has a configuration that can store power inside and output the stored power to the bus line 10 via pin 1 (BUS) of the connector 101a. However, this configuration is omitted in the diagram.

The connector 101a is a connector that can be connected to any of the connectors 30a, 30b, 30c . . . shown in FIG. 1 and has five pins as shown in FIG. 2. Pin 1 (BUS) is a pin for outputting power from the power supply device 100a to the line 11 of the bus line 10. Pin 2 (GND) is a pin for connection to the line 13 of the bus line 10 and has a role of grounding. Pin 3 (JPRA) and pin 5 (JPRB) are pins for connection to the line 12. Pin 4 (Vcc) is a pin for connection to the line 14.

The microprocessor 110 is a processor that controls the operation of the power supply device 100a. In the present embodiment, it has a function to detect the voltage of pin 3 (JPRA) and a function to control turning-on/off of the switch 111. The microprocessor 110 may have a high-impedance input because it detects only the voltage level of pin 3 (JPRA). The microprocessor 110 can have such an impedance that erroneous operation due to noise can be prevented in the detection of the voltage level of pin 3 (JPRA), and may carry out filtering in a software manner against noise.

The microprocessor 110 includes a communication section 121, a position detection signal detector 122, and a position detection signal responder 123. The communication section 121 carries out communication with the power supply managing device 50. The position detection signal detector 122 detects the voltage generated at pin 3 (JPRA). The position detection signal responder 123 responds that the voltage is detected to the power supply managing device 50 via the communication section 121 in response to the voltage detection by the position detection signal detector 122.

The communication between the power supply managing device 50 and the power supply device 100a may be carried out by a wired system or may be wirelessly carried out. If the communication between the power supply managing device 50 and the power supply device 100a is carried out by a wired system, power line communication via the bus line 10 may be used. Alternatively, a communication line may be provided separately from the bus line 10 and communication by this communication line may be used.

The switch 111 is a switch having a function to switch connection between pin 4 (Vcc) and pin 5 (JPRB). As described above, turning-on/off of the switch 111 is controlled by the microprocessor 110. The resistor R11 is provided between the switch 111 and pin 5 (JPRB). When the switch 111 is turned on, the power supply device 100a outputs the operating DC (direct current) power flowing through the line 14 to pin 5 (JPRB) via the resistor R11.

The configuration of the power supply device 100a according to the first embodiment of the present disclosure is described above with use of FIG. 2. Next, the configuration of the power supply managing device 50 according to the first embodiment of the present disclosure will be described with use of FIG. 3.

1-3. Configuration of Power Supply Managing Device

Figure 3:
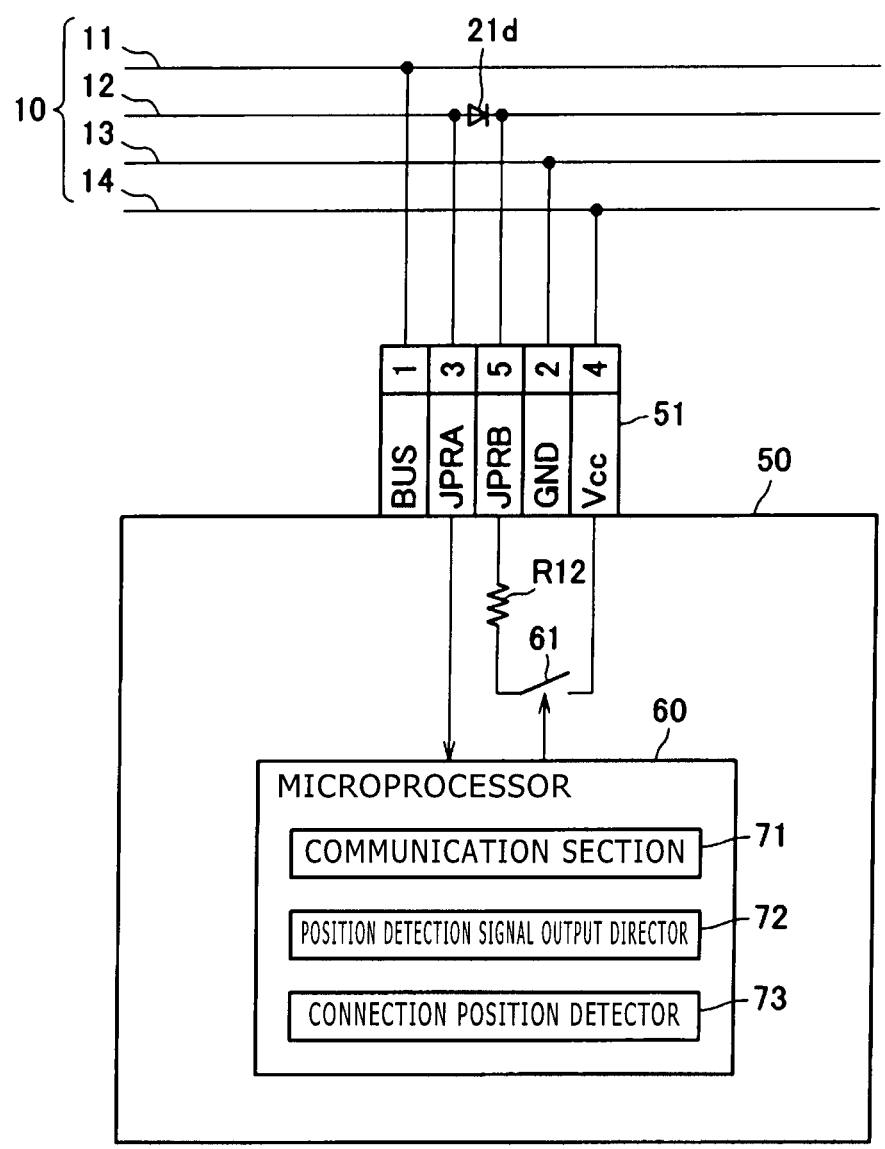
FIG. 3 is an explanatory diagram showing the configuration of a power supply managing device according to the first embodiment of the present disclosure.

FIG. 3 is an explanatory diagram showing the configuration of the power supply managing device 50 according to the first embodiment of the present disclosure. The configuration of the power supply managing device 50 according to the first embodiment of the present disclosure will be described below with use of FIG. 3.

As shown in FIG. 3, the power supply managing device 50 according to the first embodiment of the present disclosure includes a connector 51, a microprocessor 60, a switch 61, and a resistor R12.

The connector 51 is a connector that can be connected to any of the connectors 30a, 30b, 30c . . . shown in FIG. 1 and has five pins as shown in FIG. 3. Pin 1 (BUS) is a pin for receiving power from the power supply device 100a from the line 11 of the bus line 10. Pin 2 (GND) is a pin for connection to the line 13 of the bus line 10 and has a role of grounding. Pin 3 (JPRA) and pin 5 (JPRB) are pins for connection to the line 12. Pin 4 (Vcc) is a pin for connection to the line 14.

The microprocessor 60 is a processor that controls the operation of the power supply managing device 50. In the present embodiment, it can turn on the switch 61 and generate the voltage Vcc in the line 12 in order to acquire the connection position of the power supply device connected to the bus line 10. The power supply managing device 50 turns on the switch 61 and generates the voltage Vcc in the line 12. In addition, the power supply device 100a connected to the bus line 10 turns on the switch 111. This makes it possible to detect the voltage of pin 3 (JPRA) by the microprocessor 110.

The microprocessor 60 includes a communication section 71, a position detection signal output director 72, and a connection position detector 73. The communication section 71 carries out communication with the power supply device 100a and so forth. The position detection signal output director 72 orders output of a predetermined voltage to the line 12. When output of the predetermined voltage to the line 12 is ordered by the position detection signal output director 72, the switch 61 is turned on and the voltage Vcc is generated in the line 12. The connection position detector 73 sends out a command to turn on the switch 111 to a given power supply device via the communication section 71, and receives a response from the power supply device via the communication section 71. Thereby, the connection position detector 73 detects the position of connection of the power supply device to the bus line 10.

The configuration of the power supply managing device 50 according to the first embodiment of the present disclosure is described above with use of FIG. 3. Next, a method for detecting the position of the power supply device on the bus line by the power supply managing device 50 according to the first embodiment of the present disclosure will be described.

1-4. Method for Detecting Position of Power Supply Device

Figure 4B:
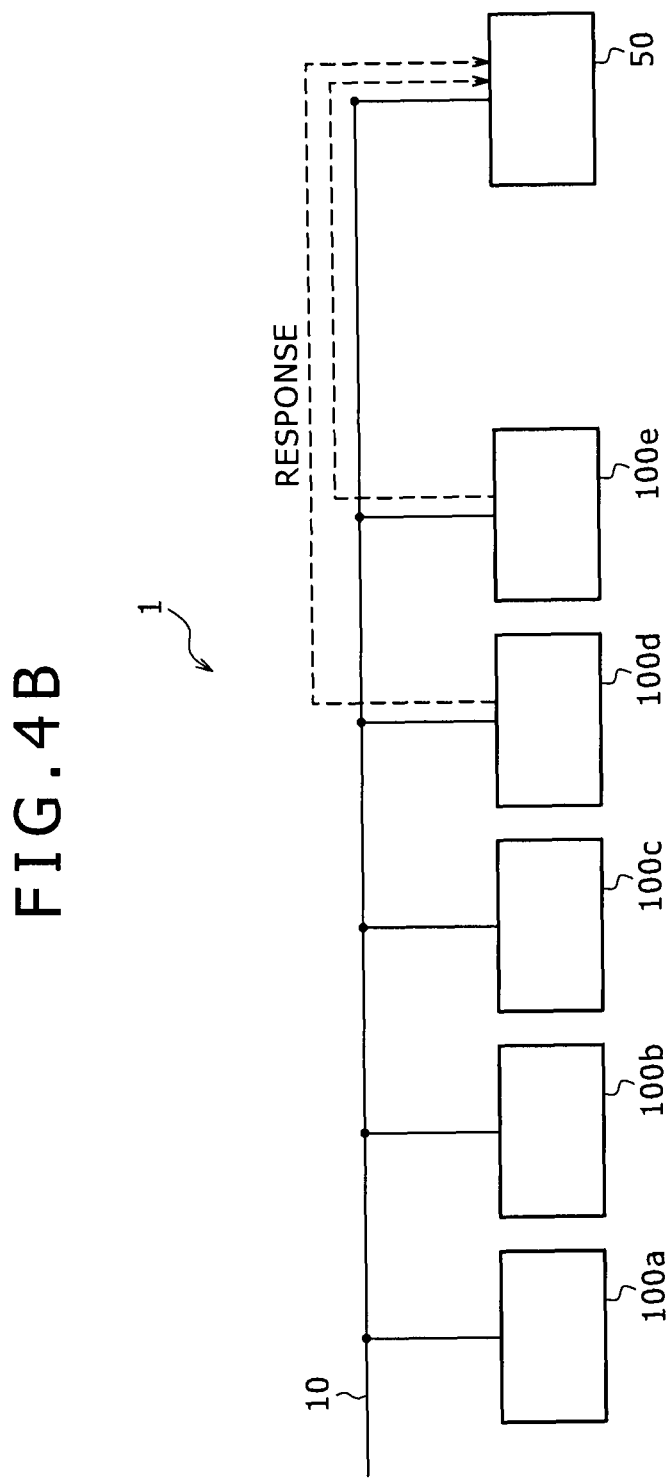
FIG. 4B is an explanatory diagram showing the method for detecting the positions of the power supply devices on the bus line.

FIG. 4A and FIG. 4B are explanatory diagrams showing the method for detecting the position of the power supply device on the bus line by the power supply managing device 50 according to the first embodiment of the present disclosure. FIG. 4A and FIG. 4B show five power supply devices 100a to 100e. Suppose that unique IDs or addresses are assigned to these five power supply devices before the power supply managing device 50 starts the position detection processing and the power supply managing device 50 understands the unique IDs or addresses of these five power supply devices. Furthermore, the detection of the position of connection of the power supply device to the bus line by the power supply managing device 50 is based on the premise that the switches 111 of all power supply devices are in the off-state.

The power supply managing device 50 sends out a command to turn on the switch 111 by the connection position detector 73 via the communication section 71 to the power supply device having an appropriate ID or address among the power supply devices 100a to 100e connected to the bus line 10. FIG. 4A shows the case in which the command to turn on the switch 111 is sent out to the power supply device 100c.

The power supply device 100c that has received the command to turn on the switch 111 from the power supply managing device 50 turns on the switch 111 by the microprocessor 110. Due to this turning-on of the switch 111, the predetermined voltage is output to the line 12.

When the predetermined voltage is output to the line 12, in the devices on the downstream side of the power supply device 100c, i.e. the power supply devices 100d and 100e, generation of the voltage at pin 3 (JPRA) can be detected by the position detection signal detector 122 of the microprocessor 110. In the power supply devices 100d and 100e, when the generation of the voltage at pin 3 (JPRA) is detected by the position detection signal detector 122 of the microprocessor 110, the position detection signal responder 123 transmits a response indicating that the voltage is detected to the power supply managing device 50 via the communication section 121. FIG. 4B shows the state in which the power supply devices 100d and 100e transmit a response indicating that the voltage is generated at pin 3 (JPRA) to the power supply managing device 50.

Due to the transmission of the response indicating the voltage detection from the power supply devices 100d and 100e, the power supply managing device 50 can get to know all power supply devices located on the right side (downstream side) of the appropriately-specified power supply device (power supply device 100c, in the above-described example).

In contrast, in the power supply devices (power supply devices 100a and 100b, in the above-described example) located on the left side (upstream side) of the power supply device appropriately specified by the power supply managing device 50 (power supply device 100c, in the above-described example), the voltage may not be detected due to the diodes 21a and 21b. Therefore, these power supply devices do not transmit the response indicating that the voltage is detected to the power supply managing device 50, or transmit a response indicating that the voltage could not be detected.

In this configuration, the power supply managing device 50 can identify the positions of the respective power supply devices connected to the bus line 10 by using an algorithm shown below for example.

First, suppose that the power supply managing device 50 already knows that n power supply devices are connected to the bus line 10. Next, the power supply managing device 50 transmits a command to turn on the switch 111 to each power supply device, and stores the numbers of power supply devices that return a response indicating that the voltage is detected based on the turning-on of the switch 111 in a given power supply device.

For example, if the power supply managing device 50 transmits the command to turn on the switch 111 and no power supply device returns a response, it turns out that the power supply device as the target to which this command is transmitted is located on the immediate left side (upstream side) of the power supply managing device 50. If the number of power supply devices that return a response is m, it turns out that the power supply device as the target to which this command is transmitted is located at the (m+1)-th position on the upstream side from the power supply managing device 50. That is, the power supply managing device 50 can determine the order of all power supply devices merely by transmitting the command to turn on the switch 111 to (n−1) power supply devices and checking the numbers of returned responses.

For the power supply managing device 50, n slots of time span for responses from the power supply devices may be prepared. By preparing n slots of time span, the collision of the responses among the power supply devices can be avoided if the system configuration is so designed that the response is returned to the power supply managing device 50 in increasing address order for example.

The method for detecting the position of the power supply device on the bus line by the power supply managing device 50 according to the first embodiment of the present disclosure is described above. As described above, according to the first embodiment of the present disclosure, the command to turn on the switch 111 is transmitted from the power supply managing device 50 to the power supply devices connected to the bus line 10, and the numbers of power supply devices that return a response indicating that the voltage is detected based on the turning-on of the switch 111 in a given power supply device are acquired. This permits the power supply managing device 50 to understand which power supply device is connected to which connector on the bus line 10.

Figure 5:
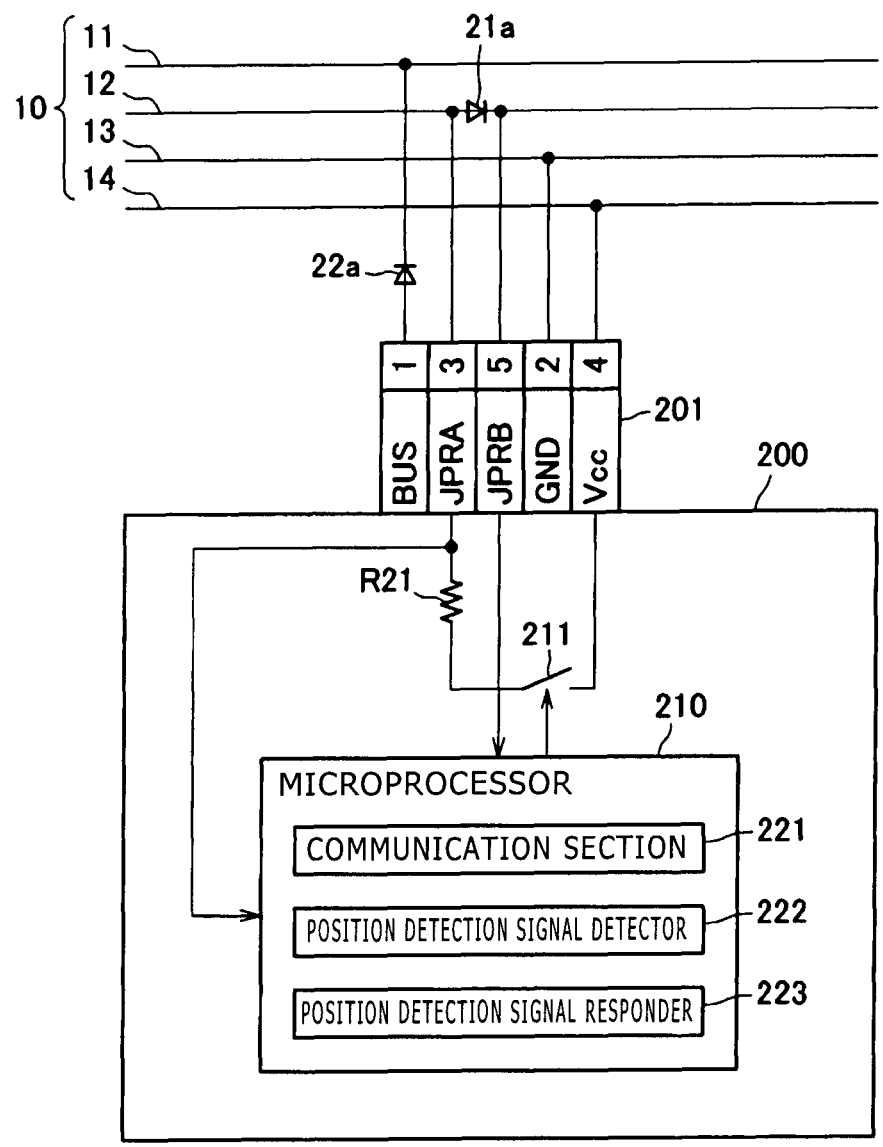
FIG. 5 is an explanatory diagram showing the configuration of a power supply device according to a second embodiment of the present disclosure.

2. Second Embodiment of Present Disclosure 2-1. Configuration of Power Supply Device Next, a second embodiment of the present disclosure will be described. FIG. 5 is an explanatory diagram showing the configuration of a power supply device 200 according to the second embodiment of the present disclosure. The configuration of the power supply device 200 according to the second embodiment of the present disclosure will be described below with use of FIG. 5.

As shown in FIG. 5, the power supply device 200 according to the second embodiment of the present disclosure includes a connector 201, a microprocessor 210, a switch 211, and a resistor R21. The power supply device 200 shown in FIG. 5 has a configuration that can store power inside and output the stored power to the bus line 10 via pin 1 (BUS) of the connector 201. However, this configuration is omitted in the diagram.

The connector 201 is a connector that can be connected to any of the connectors 30a, 30b, 30c . . . shown in FIG. 1 and has five pins as shown in FIG. 5. Pin 1 (BUS) is a pin for outputting power from the power supply device 200 to the line 11 of the bus line 10. Pin 2 (GND) is a pin for connection to the line 13 of the bus line 10 and has a role of grounding. Pin 3 (JPRA) and pin 5 (JPRB) are pins for connection to the line 12. Pin 4 (Vcc) is a pin for connection to the line 14.

The microprocessor 210 is a processor that controls the operation of the power supply device 200. In the present embodiment, it has a function to detect the voltage of pin 3 (JPRA) and pin 5 (JPRB) and a function to control turning-on/off of the switch 211. The microprocessor 210 may have a high-impedance input because it detects the voltage level of pin 3 (JPRA) and pin 5 (JPRB). The microprocessor 210 can have such an impedance that erroneous operation due to noise can be prevented in the detection of the voltage level of pin 3 (JPRA) and pin 5 (JPRB), and may carry out filtering in a software manner against noise.

The microprocessor 210 includes a communication section 221, a position detection signal detector 222, and a position detection signal responder 223. The communication section 221 carries out communication with the power supply managing device 50. The position detection signal detector 222 detects the voltage generated at pin 3 (JPRA) and pin 5 (JPRB). The position detection signal responder 223 responds that the voltage is detected to the power supply managing device 50 via the communication section 221 in response to the voltage detection by the position detection signal detector 222.

The switch 211 is a switch having a function to switch connection between pin 4 (Vcc) and pin 3 (JPRA). As described above, turning-on/off of the switch 211 is controlled by the microprocessor 210. The resistor R21 is provided between the switch 211 and pin 3 (JPRA). When the switch 211 is turned on, the power supply device 200 outputs the operating DC power flowing through the line 14 to pin 3 (JPRA) via the resistor R21.

The power supply device 200 shown in FIG. 5 is different from the power supply device 100a shown in FIG. 2 in that it outputs the operating DC power to pin 3 (JPRA) via the resistor R21 when the internal switch 211 is turned on. Furthermore, the power supply device 200 shown in FIG. 5 is different from the power supply device 100a shown in FIG. 2 in that the internal microprocessor 210 detects the voltage at pin 3 (JPRA) and pin 5 (JPRB).

Therefore, when the internal microprocessor 210 turns on the switch 211 in response to a command from the power supply managing device 50, the operating DC power is output from pin 3 (JPRA) to the line 12 via the resistor R21.

By configuring the power supply device 200 in this manner, when the given power supply device 200 connected to the bus line 10 turns on the switch 211, not only the power supply devices on the downstream side but also the adjacent power supply device on the upstream side can detect the voltage output to the line 12 and respond that the voltage is detected to the power supply managing device 50 connected to the bus line 10.

The configuration of the power supply device 200 according to the second embodiment of the present disclosure is described above with use of FIG. 5. Next, a method for detecting the position of the power supply device according to the second embodiment of the present disclosure will be described.

2-2. Method for Detecting Position of Power Supply Device

Figure 6B:
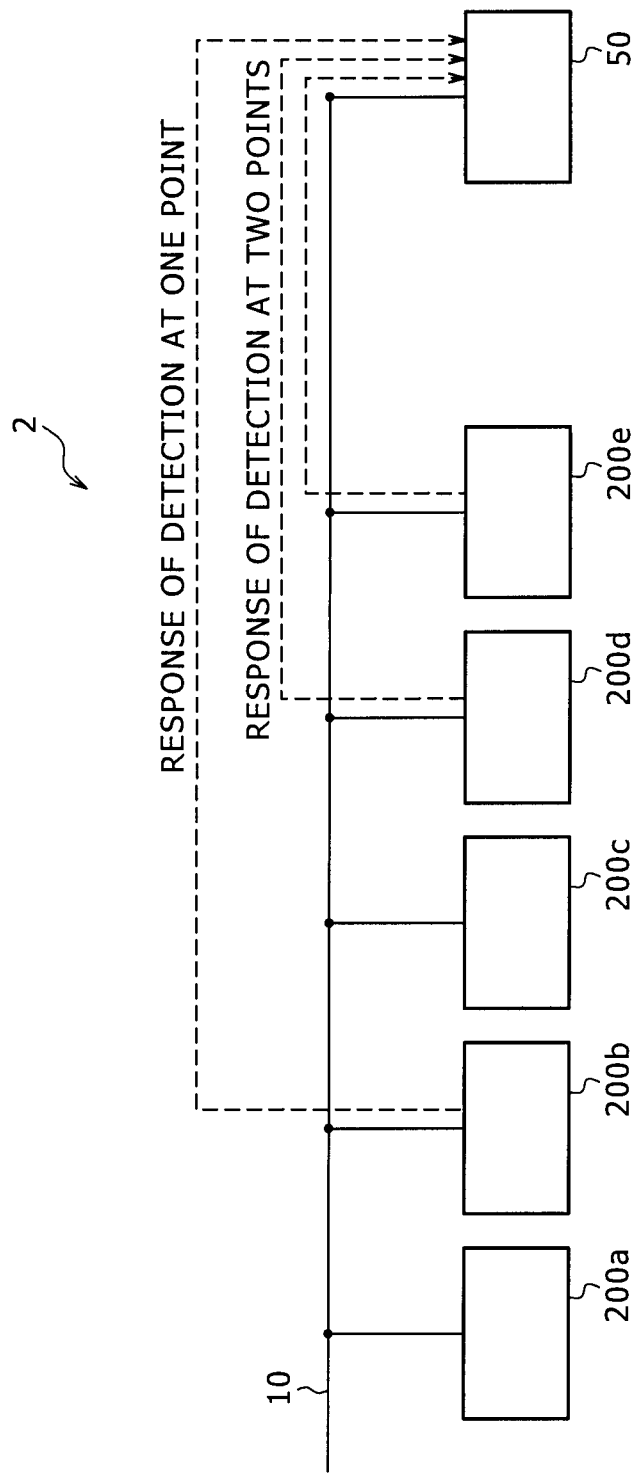
FIG. 6B is an explanatory diagram showing the method for detecting the positions of the power supply devices on the bus line.

FIG. 6A and FIG. 6B are explanatory diagrams showing the method for detecting the position of the power supply device on the bus line by the power supply managing device 50 according to the second embodiment of the present disclosure. FIG. 6A and FIG. 6B show five power supply devices 200a to 200e. These five power supply devices have the same configuration as that of the power supply device 200 shown in FIG. 5. Suppose that unique IDs or addresses are assigned to five power supply devices before the power supply managing device 50 starts the position detection processing and the power supply managing device 50 understands the unique IDs or addresses of these five power supply devices. Furthermore, the detection of the position of connection of the power supply device to the bus line by the power supply managing device 50 is based on the premise that the switches 211 of all power supply devices are in the off-state.

The power supply managing device 50 sends out a command to turn on the switch 211 to the power supply device having an appropriate ID or address among the power supply devices 200a to 200e connected to the bus line 10. FIG. 6A shows the case in which the command to turn on the switch 211 is sent out to the power supply device 200c.

The power supply device 200c that has received the command to turn on the switch 211 from the power supply managing device 50 turns on the switch 211 by the microprocessor 210. Due to this turning-on of the switch 211, the predetermined voltage is output to the line 12.

When the predetermined voltage is output to the line 12, in the devices on the downstream side of the power supply device 200c, i.e. the power supply devices 200d and 200e, generation of the voltage at pin 3 (JPRA) and pin 5 (JPRB) can be detected by the microprocessor 210. Furthermore, when the predetermined voltage is output to the line 12, in the power supply device adjacent to the power supply device 200c on the upstream side, i.e. the power supply device 200b, generation of the voltage at pin 5 (JPRB) can be detected by the microprocessor 210. Upon detecting the voltage generation at pin 3 (JPRA) and pin 5 (JPRB) by the microprocessor 210, the power supply devices 200d and 200e transmit a response indicating that the voltage is detected at pin 3 and pin 5 to the power supply managing device 50. Furthermore, upon detecting the voltage generation at pin 5 (JPRB) by the microprocessor 210, the power supply device 200b transmits a response indicating that the voltage is detected at pin 5 to the power supply managing device 50. FIG. 6B shows the state in which the power supply devices 200d and 200e transmit a response indicating the voltage generation at two points of pin 3 (JPRA) and pin 5 (JPRB) to the power supply managing device 50 and the power supply device 200b transmits a response indicating the voltage generation at one point of pin 5 (JPRB) to the power supply managing device 50.

That is, the power supply device that can detect the voltage generation at pin 5 (JPRB) but cannot the voltage generation at pin 3 (JPRA) is only one in a power supply system 2.

Therefore, in the present embodiment, when transmitting the command to turn on the switch 211 to an appropriate power supply device connected to the bus line 10, the power supply managing device 50 can detect one pair of this power supply device and the power supply device adjacent to this power supply device on the upstream side (pair of power supply devices 200b and 200c, in the example shown in FIGS. 6A and 6B). Therefore, if subsequently the power supply managing device 50 transmits the command to turn on the switch 211 to the adjacent power supply devices on the upstream side in turn, the power supply managing device 50 can identify which position on the bus line 10 the power supply device is connected regarding the power supply devices on the upstream side of the power supply device specified first. In addition, also regarding the power supply devices located on the downstream side of the power supply device specified first, which position on the bus line 10 the power supply device is connected can be identified if the command to turn on the switch 211 is transmitted in turn similarly.

The method for detecting the position of the power supply device on the bus line by the power supply managing device 50 according to the second embodiment of the present disclosure is described above. As described above, according to the second embodiment of the present disclosure, the command to turn on the switch 211 is transmitted from the power supply managing device 50 to the power supply devices connected to the bus line 10, to acquire information on the power supply device that returns a response indicating that the voltage is detected at one point based on the turning-on of the switch 211 in a given power supply device and the power supply device that returns a response indicating that the voltage is detected at two points. This permits the power supply managing device 50 to understand which power supply device is connected to which connector on the bus line 10.

Figure 7:
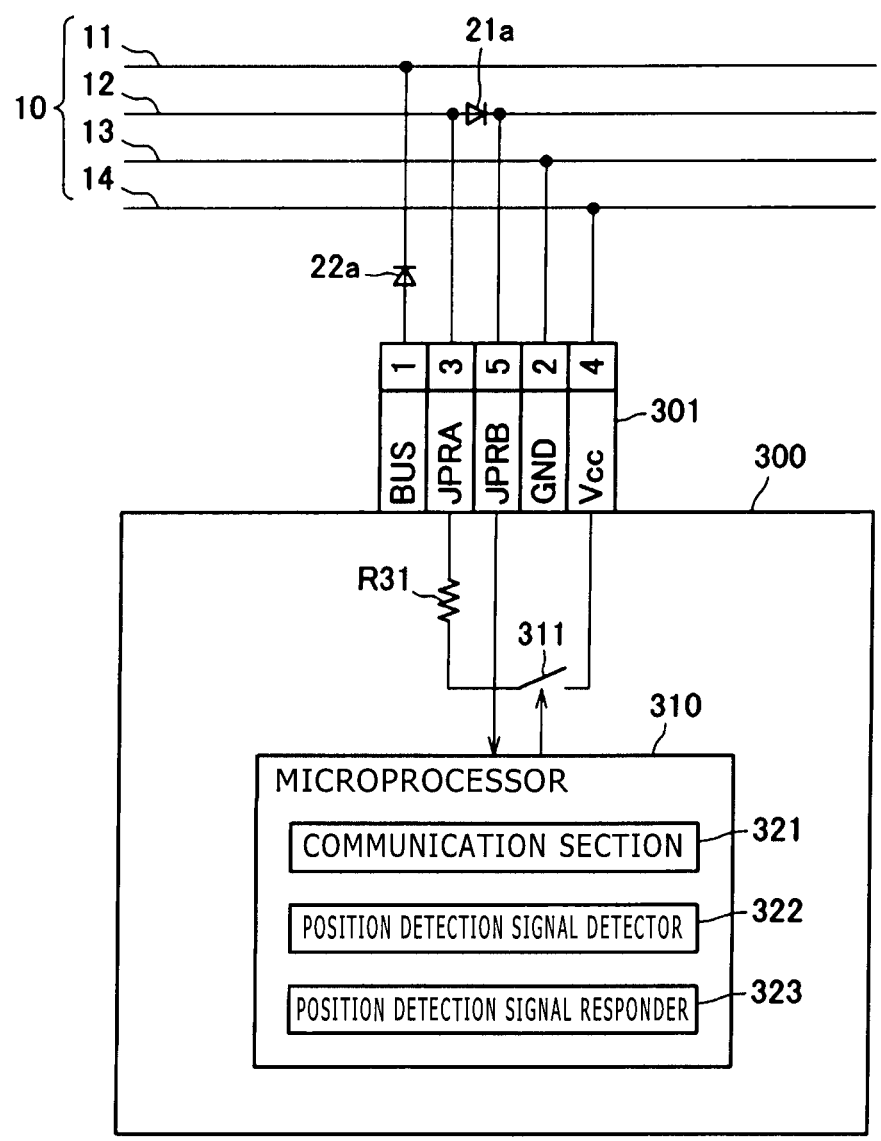
FIG. 7 is an explanatory diagram showing the configuration of a power supply device according to a third embodiment of the present disclosure.

3. Third Embodiment of Present Disclosure 3-1. Configuration of Power Supply Device Next, a third embodiment of the present disclosure will be described. FIG. 7 is an explanatory diagram showing the configuration of a power supply device 300 according to the third embodiment of the present disclosure. The configuration of the power supply device 300 according to the third embodiment of the present disclosure will be described below with use of FIG. 7.

As shown in FIG. 7, the power supply device 300 according to the third embodiment of the present disclosure includes a connector 301, a microprocessor 310, a switch 311, and a resistor R31. The power supply device 300 shown in FIG. 7 has a configuration that can store power inside and output the stored power to the bus line 10 via pin 1 (BUS) of the connector 301. However, this configuration is omitted in the diagram.

The connector 301 is a connector that can be connected to any of the connectors 30a, 30b, 30c . . . shown in FIG. 1 and has five pins as shown in FIG. 7. Pin 1 (BUS) is a pin for outputting power from the power supply device 300 to the line 11 of the bus line 10. Pin 2 (GND) is a pin for connection to the line 13 of the bus line 10 and has a role of grounding. Pin 3 (JPRA) and pin 5 (JPRB) are pins for connection to the line 12. Pin 4 (Vcc) is a pin for connection to the line 14.

The microprocessor 310 is a processor that controls the operation of the power supply device 300. In the present embodiment, it has a function to detect the voltage of pin 5 (JPRB) and a function to control turning-on/off of the switch 311. The microprocessor 310 may have a high-impedance input because it detects only the voltage level of pin 5 (JPRB). The microprocessor 310 can have such an impedance that erroneous operation due to noise can be prevented in the detection of the voltage level of pin 5 (JPRB), and may carry out filtering in a software manner against noise.

The microprocessor 310 includes a communication section 321, a position detection signal detector 322, and a position detection signal responder 323. The communication section 321 carries out communication with the power supply managing device 50. The position detection signal detector 322 detects the voltage generated at pin 5 (JPRB). The position detection signal responder 323 responds that the voltage is detected to the power supply managing device 50 via the communication section 321 in response to the voltage detection by the position detection signal detector 322.

The switch 311 is a switch having a function to switch connection between pin 4 (Vcc) and pin 3 (JPRA). As described above, turning-on/off of the switch 311 is controlled by the microprocessor 310. The resistor R31 is provided between the switch 311 and pin 3 (JPRA). When the switch 311 is turned on, the power supply device 300 outputs the operating DC power flowing through the line 14 to pin 3 (JPRA) via the resistor R31.

The power supply device 300 shown in FIG. 7 is different from the power supply device 200 shown in FIG. 5 in that the internal microprocessor 310 detects the voltage of only pin 5 (JPRB). Therefore, a pair of adjacent power supply devices cannot be identified even when a given power supply device turns on the switch 311 differently from the case of detecting the voltage at two points like the above-described second embodiment of the present disclosure. Thus, the power supply managing device 50 should identify the position of connection of the power supply device to the bus line 10 by a method that is different from that of the above-described second embodiment of the present disclosure.

The configuration of the power supply device 300 according to the third embodiment of the present disclosure is described above with use of FIG. 7. Next, a method for detecting the position of the power supply device according to the third embodiment of the present disclosure will be described.

3-2. Method for Detecting Position of Power Supply Device

FIG. 8A to FIG. 8D are explanatory diagrams showing the method for detecting the position of the power supply device on the bus line by the power supply managing device 50 according to the third embodiment of the present disclosure. FIG. 8A to FIG. 8D show six power supply devices 300a to 300f. These six power supply devices have the same configuration as that of the power supply device 300 shown in FIG. 7. Suppose that unique IDs or addresses are assigned to six power supply devices before the power supply managing device 50 starts the position detection processing and the power supply managing device 50 understands the unique IDs or addresses of these six power supply devices. Furthermore, the detection of the position of connection of the power supply device to the bus line by the power supply managing device 50 is based on the premise that the switches 311 of all power supply devices are in the off-state.

The power supply managing device 50 sends out a command to turn on the switch 311 to the power supply device having an appropriate ID or address among the power supply devices 300a to 300f connected to the bus line 10. FIG. 8A shows the case in which the command to turn on the switch 311 is sent out to the power supply device 300d.

The power supply device 300d that has received the command to turn on the switch 311 from the power supply managing device 50 turns on the switch 311 by the microprocessor 310. Due to this turning-on of the switch 311, the predetermined voltage is output to the line 12.

When the predetermined voltage is output to the line 12, generation of the voltage at pin 5 (JPRB) can be detected by the microprocessor 310 in the devices on the downstream side of the power supply device 300d, i.e. the power supply devices 300e and 300f, and in the power supply device adjacent to the power supply device 300d on the upstream side, i.e. the power supply device 300c.

Upon detecting the voltage generation at pin 5 (JPRB) by the microprocessor 310, the power supply devices 300c, 300e, and 300f transmit a response indicating that the voltage is detected at pin 5 to the power supply managing device 50. FIG. 8B shows the state in which the power supply devices 300c, 300e, and 300f transmit a response indicating the voltage generation at pin 5 (JPRB) to the power supply managing device 50.

Subsequently, the power supply managing device 50 transmits the command to turn on the switch 311 to any of the power supply devices 300c, 300e, and 300f, which have returned the response. For example, FIG. 8C shows the case in which the command to turn on the switch 311 is sent out to the power supply device 300e.

The power supply device 300e that has received the command to turn on the switch 311 from the power supply managing device 50 turns on the switch 311 by the microprocessor 310. Due to this turning-on of the switch 311, the predetermined voltage is output to the line 12. When the predetermined voltage is output to the line 12, generation of the voltage at pin 5 (JPRB) can be detected by the microprocessor 310 in the device on the downstream side of the power supply device 300e, i.e. the power supply device 300f, and in the power supply device adjacent to the power supply device 300e on the upstream side, i.e. the power supply device 300d.

Figure 8D:
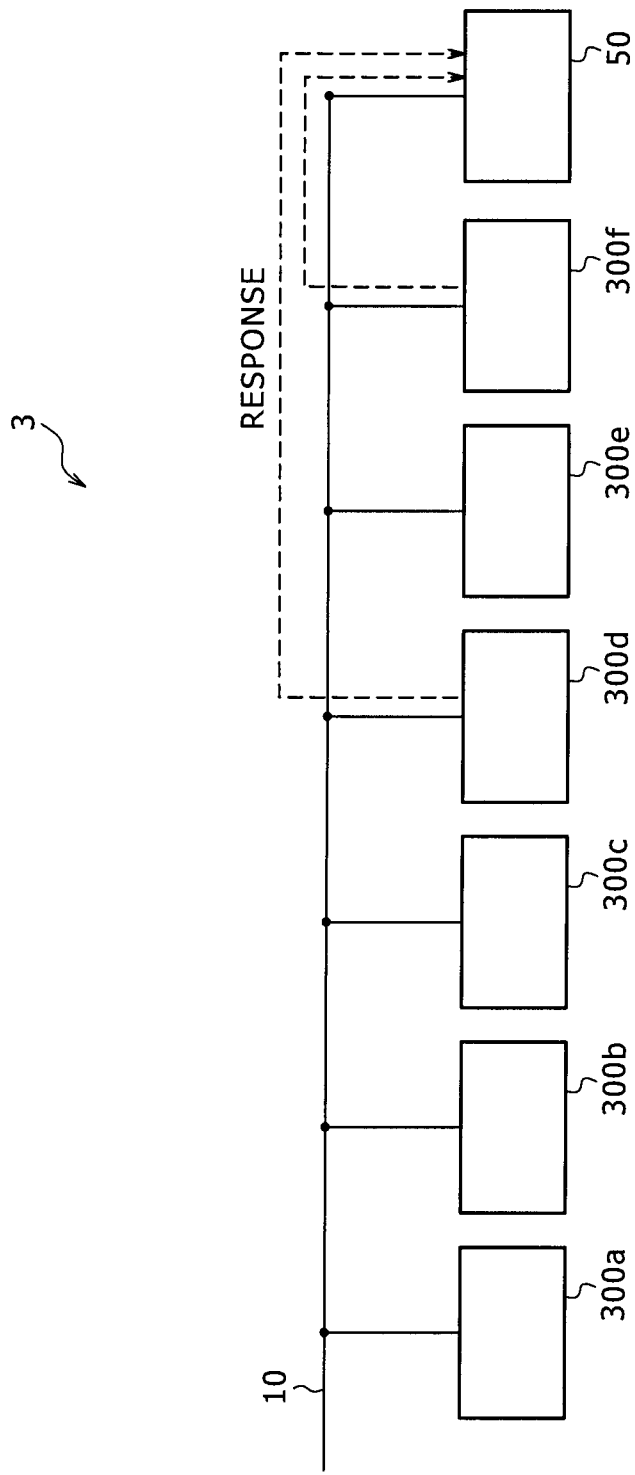
FIG. 8D is an explanatory diagram showing the method for detecting the positions of the power supply devices on the bus line.

Upon detecting the voltage generation at pin 5 (JPRB) by the microprocessor 310, the power supply devices 300d and 300f transmit a response indicating that the voltage is detected at pin 5 to the power supply managing device 50. FIG. 8D shows the state in which the power supply devices 300d and 300f transmit a response indicating the voltage generation at pin 5 (JPRB) to the power supply managing device 50.

Due to this operation, the power supply managing device 50 gets to know that the power supply devices 300c to 300f are connected to the bus line 10 in either order of 300c, 300d, 300e, and 300f or order of 300c, 300f, 300e, and 300d from the upstream side. Furthermore, because three power supply devices return the response as the result of transmission of the command to turn on the switch 311 to the power supply device 300d, it turns out that the power supply device 300d is at the third position from the power supply device on the most downstream side. Therefore, the power supply managing device 50 can detect that the power supply devices 300c to 300f are connected to the bus line 10 in order of 300c, 300d, 300e, and 300f from the upstream side.

The power supply managing device 50 sends the command to turn on the switch 311 to the power supply device 300c in order to detect the position of connection to the bus line 10 about the power supply devices 300a and 300b, whose positions of connection to the bus line 10 have not yet been detected. Then, it turns out that the power supply devices 300b, 300d, 300e, and 300f return a response. This allows the power supply managing device 50 to detect the connection positions of all power supply devices.

The method for detecting the position of the power supply device on the bus line by the power supply managing device 50 according to the third embodiment of the present disclosure is described above. As described above, according to the third embodiment of the present disclosure, the command to turn on the switch 311 is transmitted from the power supply managing device 50 to the power supply devices connected to the bus line 10, to acquire information on the power supply device that returns a response indicating that the voltage is detected based on the turning-on of the switch 311 in a given power supply device. This permits the power supply managing device 50 to understand which power supply device is connected to which connector on the bus line 10.

4. Fourth Embodiment of Present Disclosure 4-1. Configuration of Power Supply Device Next, a fourth embodiment of the present disclosure will be described. FIG. 9 is an explanatory diagram showing the configuration of a power supply device 400 according to the fourth embodiment of the present disclosure. The configuration of the power supply device 400 according to the fourth embodiment of the present disclosure will be described below with use of FIG. 9.

As shown in FIG. 9, the power supply device 400 according to the fourth embodiment of the present disclosure includes a connector 401, a microprocessor 410, a switch 411, and a resistor R41. The power supply device 400 shown in FIG. 9 has a configuration that can store power inside and output the stored power to a bus line 10' via pin 1 (BUS) of the connector 401. However, this configuration is omitted in the diagram.

The connector 401 is a connector that can be connected to any of the connectors 30a, 30b, 30c . . . shown in FIG. 1 and has five pins as shown in FIG. 9. Pin 1 (BUS) is a pin for outputting power from the power supply device 400 to the line 11 of the bus line 10'. Pin 2 (GND) is a pin for connection to the line 13 of the bus line 10' and has a role of grounding. Pin 3 (JPRA) and pin 5 (JPRB) are pins for connection to a line 12'. Pin 4 (Vcc) is a pin for connection to the line 14.

The microprocessor 410 is a processor that controls the operation of the power supply device 400. In the present embodiment, it has a function to detect the voltage of pin 3 (JPRA) and pin 5 (JPRB) and a function to control turning-on/off of the switch 411. The microprocessor 410 may have a high-impedance input because it detects the voltage level of pin 3 (JPRA) and pin 5 (JPRB). The microprocessor 410 can have such an impedance that erroneous operation due to noise can be prevented in the detection of the voltage level of pin 3 (JPRA) and pin 5 (JPRB), and may carry out filtering in a software manner against noise.

The microprocessor 410 includes a communication section 421, a position detection signal detector 422, and a position detection signal responder 423. The communication section 421 carries out communication with the power supply managing device 50. The position detection signal detector 422 detects the voltage generated at pin 3 (JPRA) and pin 5 (JPRB). The position detection signal responder 423 responds that the voltage is detected to the power supply managing device 50 via the communication section 421 in response to the voltage detection by the position detection signal detector 422.

The switch 411 is a switch having a function to switch connection between pin 4 (Vcc) and pin 3 (JPRA). As described above, turning-on/off of the switch 411 is controlled by the microprocessor 410. The resistor R41 is provided between the switch 411 and pin 3 (JPRA). When the switch 411 is turned on, the power supply device 400 outputs the operating DC power flowing through the line 14 to pin 3 (JPRA) via the resistor R41.

In the present embodiment, a diode is not provided on the line 12' of the bus line 10' differently from the above-described embodiments. If a diode is not provided on the line 12' like this, when the given power supply device 400 turns on the switch 411, only the adjacent power supply device 400 on the upstream side can detect the voltage at pin 5 (JPRB). Furthermore, if a diode is not provided on the line 12' like this, when the power supply device 400 is not connected to a connector at an intermediate position, series connection astride this connector is impossible. However, it is possible to understand the positional relationship among the power supply devices 400, including information as to which connector is not connected to the power supply device 400.

The configuration of the power supply device 400 according to the fourth embodiment of the present disclosure is described above with use of FIG. 9. Next, a method for detecting the position of the power supply device according to the fourth embodiment of the present disclosure will be described.

4-2. Method for Detecting Position of Power Supply Device

FIG. 10A to FIG. 10D are explanatory diagrams showing the method for detecting the position of the power supply device on the bus line by the power supply managing device 50 according to the fourth embodiment of the present disclosure. FIG. 10A to FIG. 10D show six power supply devices 400a to 400f. These six power supply devices have the same configuration as that of the power supply device 400 shown in FIG. 9. Suppose that unique IDs or addresses are assigned to six power supply devices before the power supply managing device 50 starts the position detection processing and the power supply managing device 50 understands the unique IDs or addresses of these six power supply devices. Furthermore, the detection of the position of connection of the power supply device to the bus line by the power supply managing device 50 is based on the premise that the switches 411 of all power supply devices are in the off-state.

The power supply managing device 50 sends out a command to turn on the switch 411 to the power supply device having an appropriate ID or address among the power supply devices 400a to 400f connected to the bus line 10'. FIG. 10A shows the case in which the command to turn on the switch 411 is sent out to the power supply device 400d.

The power supply device 400d that has received the command to turn on the switch 411 from the power supply managing device 50 turns on the switch 411 by the microprocessor 410. Due to this turning-on of the switch 411, the predetermined voltage is output to the line 12'.

When the predetermined voltage is output to the line 12', in the power supply device adjacent to the power supply device 400d on the upstream side, i.e. the power supply device 400c, generation of the voltage at pin 5 (JPRB) can be detected by the microprocessor 410.

Figure 10B:
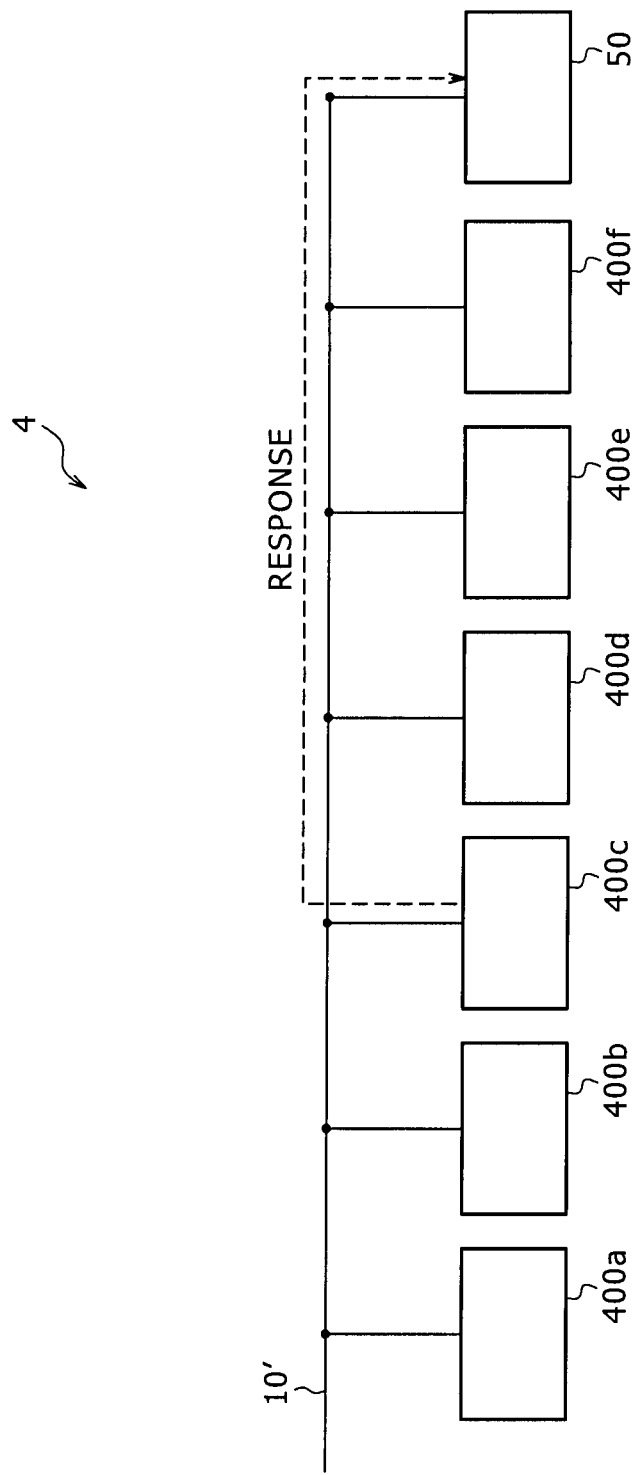
FIG. 10B is an explanatory diagram showing the method for detecting the positions of the power supply devices on the bus line.

Upon detecting the voltage generation at pin 5 (JPRB) by the microprocessor 410, the power supply device 400c transmits a response indicating that the voltage is detected at pin 5 to the power supply managing device 50. FIG. 10B shows the state in which the power supply device 400c transmits a response indicating the voltage generation at pin 5 (JPRB) to the power supply managing device 50.

In this manner, when the command to turn on the switch is sent to a given power supply device (e.g. power supply device 400d), if there is the power supply device adjacent to this power supply device on the upstream side (power supply device 400c, in the example shown in FIG. 10A), this power supply device returns a response to the power supply managing device 50. Thus, the positional relationship between these power supply devices can be understood. Therefore, the power supply managing device 50 can understand the positional relationship among the power supply devices by sequentially sending the command to turn on the switch to the power supply devices.

In contrast, when the command to turn on the switch is sent to a given power supply device, no power supply device returns a response to the power supply managing device 50 if the power supply device adjacent to this power supply device on the upstream side does not exist (i.e. the power supply device is not connected to the connector on the bus line 10').

For example, a consideration will be made about the case in which the command to turn on the switch 411 is sent out to the power supply device 400d when the power supply devices are connected to the bus line 10' as shown in FIG. 10C. In this case, the state in which the power supply device adjacent to the power supply device 400d on the upstream side does not exist (i.e. the power supply device 400c is not connected to the connector on the bus line 10') differently from the case shown in FIG. 10A is shown.

In this case, no power supply device returns a response to the power supply managing device 50. FIG. 10D shows the state in which no power supply device returns a response to the power supply managing device 50.

If the power supply device is not connected to a given connector on the bus line 10' and there are plural isolated blocks each composed of consecutive power supply devices on the bus line 10' in this manner, the position among these blocks cannot be identified. However, because series connection of the power supply devices is possible only in the isolated block, no problem is caused even if the position among the isolated blocks cannot be identified. Of course, it is obvious that parallel connection of the power supply devices between the isolated blocks can be made without problems.

The method for detecting the position of the power supply device on the bus line by the power supply managing device 50 according to the fourth embodiment of the present disclosure is described above. As described above, according to the fourth embodiment of the present disclosure, the command to turn on the switch 411 is transmitted from the power supply managing device 50 to the power supply devices connected to the bus line 10', to acquire information on the power supply device that returns a response indicating that the voltage is detected based on the turning-on of the switch 411 in a given power supply device. This permits the power supply managing device 50 to understand which power supply devices are connected to which connectors on the bus line 10' adjacent to each other, and which power supply device has its upstream side at which the power supply device is unplugged from the connector on the bus line 10'.

Figure 11:
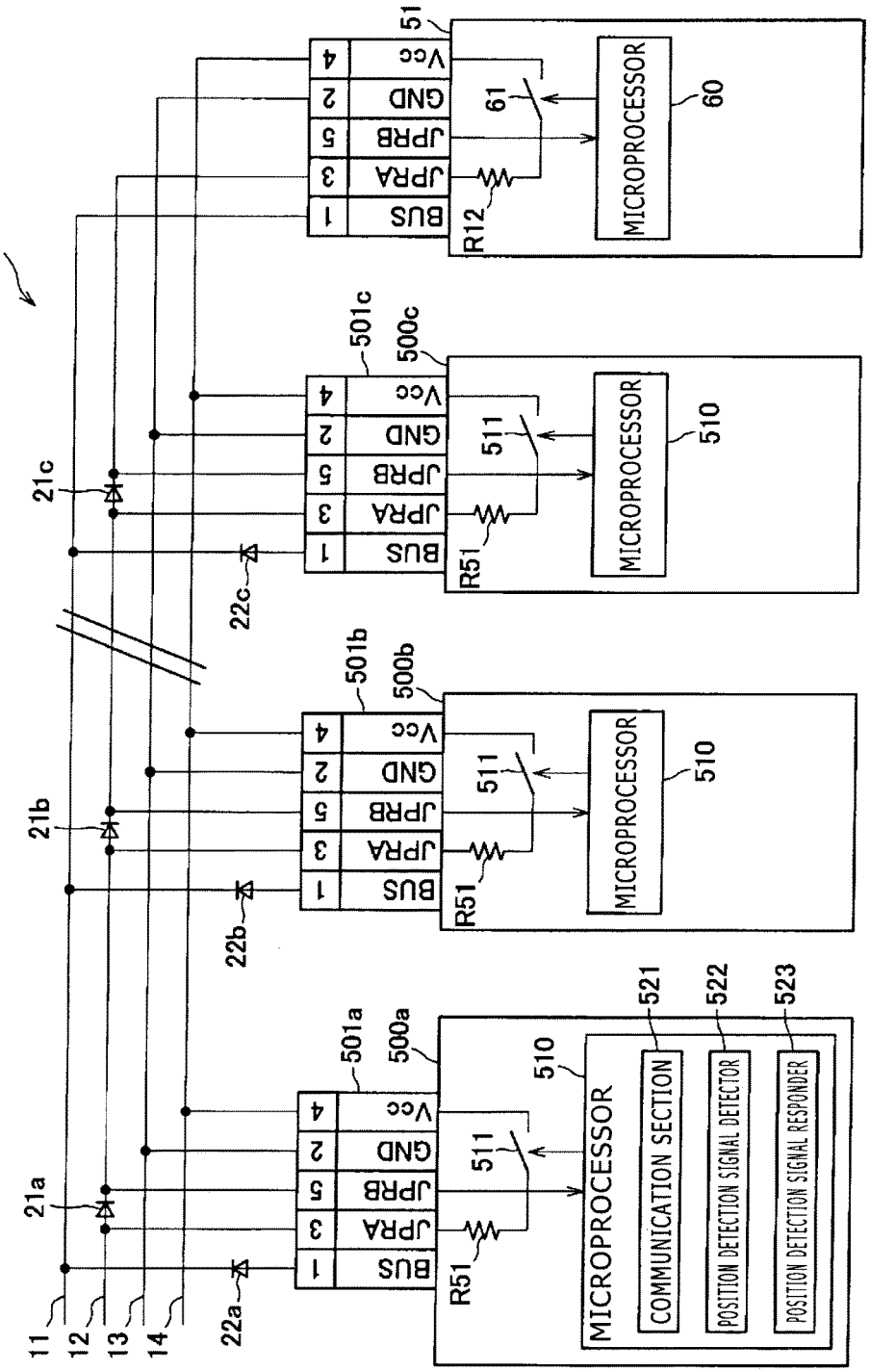
FIG. 11 is an explanatory diagram showing the configuration of a power supply system according to a fifth embodiment of the present disclosure.

5. Fifth Embodiment of Present Disclosure 5-1. Configuration of Power Supply System Next, a fifth embodiment of the present disclosure will be described. In the fifth embodiment of the present disclosure, the power supply managing device can understand the positions of connection to the bus line although addresses are not assigned to the power supply devices connected to the bus line in advance differently from the above-described respective embodiments. FIG. 11 is an explanatory diagram showing the configuration of a power supply system 5, the configuration of the power supply managing device 50, and the configurations of power supply devices 500a to 500c according to the fifth embodiment of the present disclosure. The configuration of the power supply system 5, the configuration of the power supply managing device 50, and the configurations of the power supply devices 500a to 500c according to the fifth embodiment of the present disclosure will be described below with use of FIG. 11.

As shown in FIG. 11, the power supply devices 500a to 500c according to the fifth embodiment of the present disclosure each include a connector 501, a microprocessor 510, a switch 511, and a resistor R51. The power supply devices 500a to 500c shown in FIG. 11 have a configuration that can store power inside and output the stored power to the bus line 10 via pin 1 (BUS) of the connector 501. However, this configuration is omitted in the diagram.

Furthermore, as shown in FIG. 11, the power supply managing device 50 according to the fifth embodiment of the present disclosure includes the connector 51, the microprocessor 60, the switch 61, and the resistor R12.

The power supply devices 500a to 500c shown in FIG. 11 have a configuration similar to that of the power supply device 300 shown in FIG. 7 but the function of the microprocessor 510 is different.

The connector 501 is a connector that can be connected to any of the connectors 30a, 30b, 30c ... shown in FIG. 1 and has five pins as shown in FIG. 11. Pin 1 (BUS) is a pin for outputting power from the power supply devices 500a to 500c to the line 11 of the bus line 10. Pin 2 (GND) is a pin for connection to the line 13 of the bus line 10 and has a role of grounding. Pin 3 (JPRA) and pin 5 (JPRB) are pins for connection to the line 12. Pin 4 (Vcc) is a pin for connection to the line 14.

The microprocessor 510 is a processor that controls the operation of the power supply devices 500a to 500c. In the present embodiment, it has a function to detect the voltage of pin 5 (JPRB) and a function to control turning-on/off of the switch 511. The microprocessor 510 may have a high-impedance input because it detects only the voltage level of pin 5 (JPRB). The microprocessor 510 can have such an impedance that erroneous operation due to noise can be prevented in the detection of the voltage level of pin 5 (JPRB), and may carry out filtering in a software manner against noise.

The microprocessor 510 includes a communication section 521, a position detection signal detector 522, and a position detection signal responder 523. The communication section 521 carries out communication with the power supply managing device 50. The position detection signal detector 522 detects the voltage generated at pin 5 (JPRB). The position detection signal responder 523 responds that the voltage is detected to the power supply managing device 50 via the communication section 521 in response to the voltage detection by the position detection signal detector 522.

The switch 511 is a switch having a function to switch connection between pin 4 (Vcc) and pin 3 (JPRA). As described above, turning-on/off of the switch 511 is controlled by the microprocessor 510. The resistor R51 is provided between the switch 511 and pin 3 (JPRA). When the switch 511 is turned on, the power supply devices 500a to 500c output the operating DC power flowing through the line 14 to pin 3 (JPRA) via the resistor R51.

In the present embodiment, when the voltage Vcc is output from the power supply managing device 50 to the line 12, the microprocessor 510 can detect that the voltage Vcc is generated at pin 5 (JPRB). Upon detecting the generation of the voltage Vcc at pin 5 (JPRB), the microprocessor 510 sends a response indicating the voltage detection to the power supply managing device 50 and turns on the switch 511 after a predetermined delay. Due to this turning-on of the switch 511, the power supply device (e.g. power supply device 500b) adjacent to the power supply device in which the switch 511 is turned on (e.g. power supply device 500c) on the upstream side can detect that the voltage Vcc is generated at pin 5 (JPRB).

Operating the microprocessor 510 in this manner enables the power supply managing device 50 to identify the position of connection to the bus line 10 in turn from the power supply device located on the most downstream side of the bus line 10.

The configuration of the power supply system 5, the configuration of the power supply managing device 50, and the configurations of the power supply devices 500a to 500c according to the fifth embodiment of the present disclosure are described above with use of FIG. 11. Next, a method for detecting the position of the power supply device according to the fifth embodiment of the present disclosure will be described.

5-2. Method for Detecting Position of Power Supply Device

The method for detecting the position of the power supply device according to the fifth embodiment of the present disclosure will be described below with use of the configuration of the power supply system 5 shown in FIG. 11. The detection of the position of connection of the power supply device to the bus line by the power supply managing device 50 is based on the premise that the switches 511 of all power supply devices are in the off-state. First, the power supply managing device 50 turns on the switch 61 by the microprocessor 60. Upon the turning-on of the switch 61, the voltage Vcc is generated in the line 12.

When the voltage Vcc is generated in the line 12, only the power supply device 500c adjacent to the power supply managing device 50 on the upstream side can detect that the voltage Vcc is generated at pin 5 (JPRB) by the microprocessor 510. Upon detecting the generation of the voltage Vcc at pin 5 (JPRB), the microprocessor 510 of the power supply device 500c sends a response indicating the voltage detection to the power supply managing device 50.

Upon receiving the response indicating the voltage detection from the power supply device 500c, the power supply managing device 50 decides an address to identify the power supply device 500c and notifies the power supply device 500c of the decided address. The power supply device 500c that has received the notification of the address turns on the switch 511 by the microprocessor 510. Upon the turning-on of the switch 511 of the power supply device 500c, the voltage Vcc is generated in the line 12 on the upstream side of the power supply device 500c.

When the voltage Vcc is generated in the line 12 on the upstream side of the power supply device 500c, the power supply device 500b adjacent to the power supply device 500c on the upstream side can detect that the voltage Vcc is generated at pin 5 (JPRB) by the microprocessor 510. Upon detecting the generation of the voltage Vcc at pin 5 (JPRB), the microprocessor 510 of the power supply device 500b sends a response indicating the voltage detection to the power supply managing device 50.

Upon receiving the response indicating the voltage detection from the power supply device 500b, the power supply managing device 50 decides an address to identify the power supply device 500b and notifies the power supply device 500b of the decided address. The power supply device 500b that has received the notification of the address turns on the switch 511 by the microprocessor 510. Upon the turning-on of the switch 511 of the power supply device 500b, the voltage Vcc is generated in the line 12 on the upstream side of the power supply device 500b.

When the voltage Vcc is generated in the line 12 on the upstream side of the power supply device 500b, the power supply device 500a adjacent to the power supply device 500b on the upstream side can detect that the voltage Vcc is generated at pin 5 (JPRB) by the microprocessor 510. Thereafter, an address is decided also about the power supply device 500a by the power supply managing device 50 similarly.

FIG. 12 is an explanatory diagram for explaining the method for detecting the position of the power supply device according to the fifth embodiment of the present disclosure and shows the above-described series of processing by a time chart. When the voltage Vcc is generated in the line 12 from the power supply managing device 50, the response indicating voltage detection is returned to the power supply managing device 50 in order of the power supply devices 500c, 500b, and 500a from the downstream side as described above.

As just described, by the method for detecting the position of the power supply device according to the present embodiment, although addresses are not assigned to the power supply devices connected to the bus line in advance, the power supply managing device 50 can understand the positions of connection of the power supply devices to the bus line and can give addresses to the power supply devices.

6. Summarization

As described above, according to the respective embodiments of the present disclosure, the power supply managing device to manage the power supply devices connected to the bus line generates a predetermined voltage in the bus line and outputs a command to turn on the internal switch to a given power supply device. The power supply device that has received this command can detect the predetermined voltage generated by the power supply managing device by turning on the internal switch. In addition, the power supply devices other than this power supply device can also detect the voltage generated by the power supply managing device depending on the configuration of the power supply device. The power supply device that has detected the predetermined voltage sends a response indicating that the voltage is detected to the power supply managing device. The power supply managing device that has received the response understands which power supply device returned the response to thereby be allowed to understand the connection positions of the power supply devices on the bus line.

The preferred embodiments of the present disclosure are described in detail above with reference to the accompanying drawings. However, the present disclosure is not limited to these examples. It is apparent that those who have ordinary knowledge in the field of the technique to which the present disclosure belongs can reach various kinds of change examples or modification examples within the category of the technical ideas set forth in the scope of claims, and it is understood that naturally they also belong to the technical range of the present disclosure.

The present technique can employ also the following configurations.

(1) A power supply device including
a position detection signal output section configured to output a position detection signal to a line allowing a current flow in only one direction in response to an order to output the position detection signal from a power supply managing device connected to a bus line including the line,
a position detection signal detector configured to detect the position detection signal that is output from another device and flows through the line, and
a position detection signal responder configured to respond that the position detection signal is detected to the power supply managing device when the position detection signal is detected by the position detection signal detector.

(2) The power supply device according to (1), wherein the position detection signal detector detects the position detection signal output from an upstream side of the line.

(3) The power supply device according to (2), wherein the position detection signal detector detects the position detection signal on a cathode side of a diode provided on the line.

(4) The power supply device according to (2), wherein the position detection signal detector further detects the position detection signal output from an adjacent device on a downstream side of the line.

(5) The power supply device according to (4), wherein the position detection signal detector detects the position detection signal on an anode side and a cathode side of a diode provided on the line.

(6) A power supply managing device including
a position detection signal output director configured to order one power supply device among power supply devices connected to a bus line including a line allowing a current flow in only one direction to output, to the line, a position detection signal to detect a connection position of each of the power supply devices on the bus line, and
a connection position detector configured to receive a response from the power supply device that has detected the position detection signal, and detect a position of connection of the power supply device to the bus line.

(7) A method for detecting a connection position of a power supply device, the method including
ordering one power supply device among power supply devices connected to a bus line including a line allowing a current flow in only one direction to output, to the line, a position detection signal to detect a connection position of each of the power supply devices on the bus line, and
receiving a response from the power supply device that has detected the position detection signal, and detecting a position of connection of the power supply device to the bus line.

(8) The method for detecting a connection position of a power supply device according to (7), further including
outputting the position detection signal to the line allowing a current flow in only one direction in response to an order to output the position detection signal in the ordering from a power supply managing device connected to the bus line including the line,
detecting the position detection signal that is output from another device and flows through the line, and
responding that the position detection signal is detected to the power supply managing device when detecting the position detection signal.

(9) A power supply system including
a plurality of power supply devices configured to be connected to a bus line including a line allowing a current flow in only one direction, and
a power supply managing device configured to be connected to the bus line, wherein
the power supply managing device includes
a position detection signal output director that orders one power supply device among the power supply devices to output, to the line, a position detection signal to detect a connection position of each of the power supply devices on the bus line, and
a connection position detector that receives a response from the power supply device that has detected the position detection signal, and detects a position of connection of the power supply device to the bus line, and
the power supply device includes
a position detection signal output section that outputs the position detection signal to the line in response to an order to output the position detection signal from the power supply managing device,
a position detection signal detector that detects the position detection signal that is output from another power supply device and flows through the line, and
a position detection signal responder that responds that the position detection signal is detected to the power supply managing device when the position detection signal is detected.

The present disclosure contains subject matter related to that disclosed in Japanese Priority Patent Application JP 2011-069513 filed in the Japan Patent Office on Mar. 28, 2011, the entire content of which is hereby incorporated by reference.

What is claimed is:
1. A power supply device of a bus system having a power supply managing device and one or more power supply devices being electrically connected to a bus line that includes a first line having one or more diodes connected in series, the power supply device comprising:
   circuitry configured to
      receive a unique address assigned to the power supply device,
      receive an order addressed to the power supply device from the power supply managing device to output a position detection signal, and
      output the position detection signal to a side of a corresponding diode of the one or more diodes on the first line by turning on a switch connecting the first line with a second line that supplies power,
   wherein the circuitry is further configured to detect another position detection signal outputted from another power supply device in the first line, and output a response to the power supply managing device when the another position detection signal outputted from the another power supply device is detected.

2. The power supply device according to claim 1, wherein the circuitry is further configured to detect the position detection signal on a cathode side of the diode provided on the first line.

3. The power supply device according to claim 1, wherein the circuitry is further configured to detect the position detection signal on an anode side and a cathode side of a diode provided on the first line.

4. The power supply device according to claim 1, wherein the position detection signal is a voltage signal.

5. The power supply device according to claim 1, wherein the response to the position detection signal is a voltage signal.

6. The power supply device according to claim 1, wherein the circuitry is further configured to output the position detection signal on a cathode side of the diode provided on the first line.

7. The power supply device according to claim 1, wherein the circuitry is further configured to output the position detection signal on an anode side of the diode provided on the first line.

8. The power supply device according to claim 1, wherein the circuitry is further configured to output the position detection signal on an anode side and a cathode side of the diode provided on the first line.

9. The power supply device according to claim 1, wherein the circuitry is further configured to:
   output a response to the power supply managing device indicating the position detection signal is detected when the another position detection signal outputted from the another power supply device is detected, and
   indicate the another position detection signal is not detected when the another position detection signal outputted from the another power supply device is not detected.

10. The power supply device according to claim 1, wherein the circuitry is further configured to supply power to a third line and to the power supply managing device.

11. A bus system, comprising:
   a bus line connecting one or more power supply devices in series, and which includes a first line having one or more diodes connected in series and a second line operating the power supply devices;
   a power supply managing device comprising:
      first circuitry configured to
         assign a unique address to one power supply device among the one or more power supply devices connected to the bus line to output a position detection signal,
         order the one power supply device to output the position detection signal,
         receive responses from power supply devices that have detected the position detection signal, and
         determine a position of the ordered one power supply device on the bus line, and
   wherein the one or more power supply devices each comprises:
      second circuitry configured to
         receive the assigned unique address,
         detect the order from the power supply managing device to output the position detection signal,
         output the position detection signal to a side of a corresponding diode of the one or more diodes on the first line by turning on a switch connecting the first line with a second line that supplies power,
      wherein the second circuitry is further configured to detect another position detection signal outputted from another power supply device in the first line, and output a response to the power supply managing device when the other position detection signal outputted from the another power supply device is detected, and
      wherein the power supply managing device determines the position of the ordered one power supply device based on the number of responses received from the power supply devices that have detected the position detection signal outputted from the another power supply device after ordering the one power supply device to output the position detection signal.

* * * * *